United States Patent
Liang et al.

(10) Patent No.: US 9,613,004 B2
(45) Date of Patent: Apr. 4, 2017

(54) NLP-BASED ENTITY RECOGNITION AND DISAMBIGUATION

(71) Applicant: VCVC III LLC, Seattle, WA (US)

(72) Inventors: Jisheng Liang, Bellevue, WA (US); Krzysztof Koperski, Seattle, WA (US); Navdeep S. Dhillon, Seattle, WA (US); Carsten Tusk, Seattle, WA (US); Satish Bhatti, Seattle, WA (US)

(73) Assignee: VCVC III LLC, Seattle, WA (US)

( * ) Notice: Subject to any disclaimer, the term of this patent is extended or adjusted under 35 U.S.C. 154(b) by 377 days.

(21) Appl. No.: 13/944,340

(22) Filed: Jul. 17, 2013

(65) Prior Publication Data
US 2014/0142922 A1 May 22, 2014

Related U.S. Application Data

(63) Continuation of application No. 12/288,158, filed on Oct. 15, 2008, now Pat. No. 8,594,996.
(Continued)

(51) Int. Cl.
G06F 17/21 (2006.01)
G06F 17/27 (2006.01)

(52) U.S. Cl.
CPC ............ *G06F 17/21* (2013.01); *G06F 17/278* (2013.01)

(58) Field of Classification Search
CPC ............ G06F 17/278; G06F 17/30864; G06F 17/30616; G06F 17/2775; G06F 17/30734;
(Continued)

(56) References Cited

U.S. PATENT DOCUMENTS 4,839,853 A 6/1989 Deerwester et al. ......... 364/900
4,887,212 A 12/1989 Zamora et al.
(Continued)

FOREIGN PATENT DOCUMENTS

EP 0 280 866 9/1988
EP 0 585 079 3/1994
(Continued)

OTHER PUBLICATIONS

Ruiz-Casado, Maria, Enrique Alfonseca, and Pablo Castells. "From Wikipedia to Semantic Relationships: a Semi-automated Annotation Approach." SemWiki 206 (2006).*
(Continued)

*Primary Examiner* — Douglas Godbold
*Assistant Examiner* — Mark Villena
(74) *Attorney, Agent, or Firm* — Ellen M. Bierman; Lowe Graham Jones PLLC

(57) ABSTRACT

Methods and systems for entity recognition and disambiguation using natural language processing techniques are provided. Example embodiments provide an entity recognition and disambiguation system (ERDS) and process that, based upon input of a text segment, automatically determines which entities are being referred to by the text using both natural language processing techniques and analysis of information gleaned from contextual data in the surrounding text. In at least some embodiments, supplemental or related information that can be used to assist in the recognition and/or disambiguation process can be retrieved from knowledge repositories such as an ontology knowledge base. In one embodiment, the ERDS comprises a linguistic analysis engine, a knowledge analysis engine, and a disambiguation engine that cooperate to identify candidate entities from a knowledge repository and determine which of the candidates
(Continued)

best matches the one or more detected entities in a text segment using context information.

23 Claims, 9 Drawing Sheets

Related U.S. Application Data

(60) Provisional application No. 60/980,747, filed on Oct. 17, 2007.

(58) Field of Classification Search
CPC ........... G06F 17/2705; G06F 17/30011; G06F 17/30634; G06F 17/30705
USPC .......................... 704/9; 707/999.001–999.009
See application file for complete search history.

(56) References Cited

U.S. PATENT DOCUMENTS

| | | | |
|---|---|---|---|
| 5,301,109 A | 4/1994 | Landauer et al. ........ 364/419.19 |
| 5,317,507 A | 5/1994 | Gallant .................... 364/419.13 |
| 5,325,298 A | 6/1994 | Gallant .................... 364/419.19 |
| 5,331,556 A | 7/1994 | Black, Jr. et al. ........ 364/419.08 |
| 5,377,103 A | 12/1994 | Lamberti et al. ........ 364/419.08 |
| 5,590,322 A | 12/1996 | Harding et al. |
| 5,619,709 A | 4/1997 | Caid et al. .................... 395/794 |
| 5,634,051 A | 5/1997 | Thomson ..................... 395/605 |
| 5,752,022 A | 5/1998 | Chiu et al. |
| 5,778,362 A | 7/1998 | Deerwester ...................... 707/5 |
| 5,794,050 A | 8/1998 | Dahlgren et al. ............. 395/708 |
| 5,794,178 A | 8/1998 | Caid et al. ........................ 704/9 |
| 5,799,268 A | 8/1998 | Boguraev ........................ 704/9 |
| 5,848,417 A | 12/1998 | Shoji et al. ................... 707/102 |
| 5,857,179 A | 1/1999 | Vaithyanathan et al. ......... 707/2 |
| 5,884,302 A | 3/1999 | Ho .................................. 707/3 |
| 5,933,822 A | 8/1999 | Braden-Harder et al. ........ 707/5 |
| 5,950,189 A | 9/1999 | Cohen et al. ...................... 707/3 |
| 5,982,370 A | 11/1999 | Kamper ......................... 345/356 |
| 6,006,221 A | 12/1999 | Liddy et al. ...................... 707/5 |
| 6,006,225 A | 12/1999 | Bowman et al. ................. 707/5 |
| 6,026,388 A | 2/2000 | Liddy et al. ...................... 707/1 |
| 6,061,675 A | 5/2000 | Wical .............................. 706/45 |
| 6,064,951 A | 5/2000 | Park et al. ........................ 704/8 |
| 6,122,647 A | 9/2000 | Horowitz et al. ............. 707/513 |
| 6,167,368 A * | 12/2000 | Wacholder ........................ 704/9 |
| 6,178,416 B1 | 1/2001 | Thompson et al. .............. 707/3 |
| 6,185,550 B1 | 2/2001 | Snow et al. ..................... 707/1 |
| 6,192,360 B1 | 2/2001 | Dumais et al. ................... 707/6 |
| 6,202,064 B1 | 3/2001 | Julliard .............................. 707/5 |
| 6,219,664 B1 | 4/2001 | Watanabe ......................... 707/3 |
| 6,246,977 B1 | 6/2001 | Messerly et al. ................. 704/9 |
| 6,311,152 B1 | 10/2001 | Bai et al. .......................... 704/9 |
| 6,363,373 B1 | 3/2002 | Steinkraus ........................ 707/3 |
| 6,405,190 B1 | 6/2002 | Conklin ............................ 707/3 |
| 6,411,962 B1 | 6/2002 | Kupiec ......................... 707/102 |
| 6,460,029 B1 | 10/2002 | Fries et al. ........................ 707/3 |
| 6,484,162 B1 | 11/2002 | Edlund et al. .................... 707/3 |
| 6,510,406 B1 | 1/2003 | Marchisio ......................... 704/9 |
| 6,571,236 B1 | 5/2003 | Ruppelt ............................. 707/3 |
| 6,584,464 B1 | 6/2003 | Warthen ............................ 707/4 |
| 6,601,026 B2 | 7/2003 | Appelt et al. ..................... 704/9 |
| 6,728,707 B1 | 4/2004 | Wakefield et al. ............... 707/5 |
| 6,732,097 B1 | 5/2004 | Wakefield et al. ............... 707/5 |
| 6,732,098 B1 | 5/2004 | Wakefield et al. ............... 707/5 |
| 6,738,765 B1 | 5/2004 | Wakefield et al. ............... 707/5 |
| 6,741,988 B1 | 5/2004 | Wakefield et al. ............... 707/7 |
| 6,745,161 B1 | 6/2004 | Arnold et al. .................... 704/7 |
| 6,757,646 B2 | 6/2004 | Marchisio ......................... 704/8 |
| 6,859,800 B1 | 2/2005 | Roche et al. ..................... 707/3 |
| 6,862,710 B1 | 3/2005 | Marchisio ................... 715/501.1 |
| 6,904,433 B2 | 6/2005 | Kapitskaia et al. ............ 707/10 |
| 6,910,003 B1 | 6/2005 | Arnold et al. .................... 704/4 |
| 6,996,575 B2 | 2/2006 | Cox et al. ..................... 707/102 |
| 7,051,017 B2 | 5/2006 | Marchisio ......................... 707/3 |
| 7,054,854 B1 | 5/2006 | Hattori et al. .................... 707/3 |
| 7,171,349 B1 | 1/2007 | Wakefield et al. ............... 704/9 |
| 7,283,951 B2 | 10/2007 | Marchisio et al. ............... 704/9 |
| 7,398,201 B2 | 7/2008 | Marchisio et al. ............... 704/9 |
| 7,403,938 B2 | 7/2008 | Harrison et al. .................. 707/3 |
| 7,451,135 B2 | 11/2008 | Goldman et al. ................ 707/3 |
| 7,526,425 B2 | 4/2009 | Marchisio et al. ............... 704/9 |
| 7,529,756 B1 | 5/2009 | Haschart et al. |
| 7,672,833 B2 | 3/2010 | Blume et al. ................... 704/10 |
| 7,752,200 B2 | 7/2010 | Scholl et al. .................. 707/730 |
| 7,788,084 B2 | 8/2010 | Brun et al. ........................ 704/7 |
| 8,112,402 B2 | 2/2012 | Cucerzan et al. ............. 707/705 |
| 8,122,016 B1 | 2/2012 | Lamba et al. ................. 707/723 |
| 8,122,026 B1 | 2/2012 | Laroco, Jr. et al. ........... 707/737 |
| 8,594,996 B2 | 11/2013 | Liang et al. |
| 8,666,909 B2 | 3/2014 | Pinckney et al. ................ 706/11 |
| 8,700,604 B2 | 4/2014 | Roseman et al. |
| 8,725,739 B2 | 5/2014 | Liang et al. |
| 8,856,096 B2 | 10/2014 | Marchisio et al. |
| 8,954,469 B2 | 2/2015 | Dhillon et al. |
| 2002/0007267 A1 | 1/2002 | Batchilo et al. .................. 704/9 |
| 2002/0010574 A1 | 1/2002 | Tsourikov et al. ............... 704/9 |
| 2002/0022956 A1 | 2/2002 | Ukrainczyk et al. ............ 704/9 |
| 2002/0059161 A1 | 5/2002 | Li ...................................... 707/1 |
| 2002/0078041 A1 | 6/2002 | Wu .................................... 707/4 |
| 2002/0078045 A1 | 6/2002 | Dutta ................................ 707/7 |
| 2002/0091671 A1 | 7/2002 | Prokoph ........................... 707/1 |
| 2002/0103789 A1 | 8/2002 | Turnbull et al. .................. 707/3 |
| 2002/0120651 A1 | 8/2002 | Pustejovsky et al. ......... 707/513 |
| 2003/0004716 A1 | 1/2003 | Haigh et al. .................. 704/238 |
| 2003/0101182 A1 | 5/2003 | Gorvin et al. ..................... 707/7 |
| 2003/0115065 A1 | 6/2003 | Kakivaya et al. ........... 704/270.1 |
| 2003/0115191 A1 | 6/2003 | Copperman et al. ............. 707/3 |
| 2003/0191626 A1* | 10/2003 | Al-Onaizan et al. ............ 704/8 |
| 2003/0233224 A1 | 12/2003 | Marchisio et al. ............... 704/4 |
| 2004/0010508 A1 | 1/2004 | Fest et al. ...................... 707/102 |
| 2004/0064447 A1 | 4/2004 | Simske et al. .................... 707/5 |
| 2004/0103090 A1 | 5/2004 | Dogl et al. ........................ 707/3 |
| 2004/0125877 A1 | 7/2004 | Chang et al. ............. 375/240.28 |
| 2004/0167870 A1 | 8/2004 | Wakefield et al. ............... 707/1 |
| 2004/0167883 A1 | 8/2004 | Wakefield et al. ............... 707/3 |
| 2004/0167884 A1 | 8/2004 | Wakefield et al. ............... 707/3 |
| 2004/0167885 A1 | 8/2004 | Wakefield et al. ............... 707/3 |
| 2004/0167886 A1 | 8/2004 | Wakefield et al. ............... 707/3 |
| 2004/0167887 A1 | 8/2004 | Wakefield et al. ............... 707/3 |
| 2004/0167907 A1 | 8/2004 | Wakefield et al. ............. 707/100 |
| 2004/0167908 A1 | 8/2004 | Wakefield et al. ............. 707/100 |
| 2004/0167909 A1 | 8/2004 | Wakefield et al. ............. 707/100 |
| 2004/0167910 A1 | 8/2004 | Wakefield et al. ............. 707/100 |
| 2004/0167911 A1 | 8/2004 | Wakefield et al. ............. 707/100 |
| 2004/0221235 A1 | 11/2004 | Marchisio et al. ............ 715/534 |
| 2004/0243388 A1 | 12/2004 | Corman et al. ................... 704/1 |
| 2005/0027704 A1 | 2/2005 | Hammond et al. .............. 707/5 |
| 2005/0076365 A1 | 4/2005 | Popov et al. ................... 725/46 |
| 2005/0108001 A1 | 5/2005 | Aarskog ......................... 704/10 |
| 2005/0108262 A1 | 5/2005 | Fawcett, Jr. et al. ......... 707/100 |
| 2005/0138018 A1 | 6/2005 | Sakai et al. ....................... 707/3 |
| 2005/0149494 A1 | 7/2005 | Lindh et al. ...................... 707/3 |
| 2005/0177805 A1 | 8/2005 | Lynch et al. .................. 715/968 |
| 2005/0197828 A1 | 9/2005 | McConnell et al. ............. 704/9 |
| 2005/0210000 A1 | 9/2005 | Michard ............................ 707/3 |
| 2005/0216443 A1 | 9/2005 | Morton et al. .................... 707/3 |
| 2005/0234879 A1 | 10/2005 | Zeng et al. ........................ 707/3 |
| 2005/0234968 A1 | 10/2005 | Arumainayagam et al. |
| 2005/0262050 A1 | 11/2005 | Fagin et al. |
| 2005/0267871 A1 | 12/2005 | Marchisio et al. ............... 707/3 |
| 2006/0149734 A1 | 7/2006 | Egnor et al. ...................... 707/7 |
| 2006/0167862 A1 | 7/2006 | Reisman |
| 2006/0224565 A1* | 10/2006 | Ashutosh et al. ................ 707/3 |
| 2006/0229889 A1 | 10/2006 | Hodjat et al. |
| 2006/0271353 A1 | 11/2006 | Berkan et al. |
| 2006/0279799 A1 | 12/2006 | Goldman ....................... 358/403 |
| 2007/0067285 A1 | 3/2007 | Blume et al. ..................... 707/5 |
| 2007/0130194 A1 | 6/2007 | Kaiser .......................... 707/102 |
| 2007/0136326 A1 | 6/2007 | McClement et al. .......... 707/100 |
| 2007/0143300 A1 | 6/2007 | Gulli et al. ..................... 707/10 |
| 2007/0209013 A1 | 9/2007 | Ramsey et al. ................ 715/769 |
| 2007/0233656 A1* | 10/2007 | Bunescu et al. .................. 707/3 |
| 2007/0276830 A1 | 11/2007 | Gruhl et al. |

(56) References Cited

U.S. PATENT DOCUMENTS

| | | | |
|---|---|---|---|
| 2008/0005651 A1 | 1/2008 | Grefenstette et al. | 715/500 |
| 2008/0010270 A1 | 1/2008 | Gross | 707/5 |
| 2008/0059456 A1 | 3/2008 | Chowdhury et al. | 707/5 |
| 2008/0082578 A1 | 4/2008 | Hogue et al. | 707/104.1 |
| 2008/0097975 A1 | 4/2008 | Guay et al. | 707/4 |
| 2008/0097985 A1 | 4/2008 | Olstad et al. | 707/5 |
| 2008/0120129 A1 | 5/2008 | Seubert et al. | |
| 2008/0127331 A1 | 5/2008 | Seidman et al. | |
| 2008/0208864 A1* | 8/2008 | Cucerzan et al. | 707/8 |
| 2008/0222105 A1 | 9/2008 | Matheny | |
| 2008/0228720 A1 | 9/2008 | Mukherjee et al. | 707/3 |
| 2008/0235203 A1 | 9/2008 | Case et al. | 707/5 |
| 2008/0249991 A1 | 10/2008 | Valz | |
| 2008/0303689 A1 | 12/2008 | Iverson | 340/825.36 |
| 2009/0070325 A1 | 3/2009 | Gabriel et al. | |
| 2009/0144609 A1 | 6/2009 | Liang et al. | 715/230 |
| 2009/0187467 A1 | 7/2009 | Fang et al. | 705/10 |
| 2009/0228439 A1 | 9/2009 | Manolescu et al. | 707/3 |
| 2009/0248678 A1 | 10/2009 | Okamoto et al. | 707/5 |
| 2009/0327223 A1 | 12/2009 | Chakrabarti et al. | |
| 2010/0010994 A1 | 1/2010 | Wittig et al. | 707/6 |
| 2010/0046842 A1 | 2/2010 | Conwell | 382/218 |
| 2010/0048242 A1 | 2/2010 | Rhoads et al. | 455/556.1 |
| 2010/0145940 A1 | 6/2010 | Chen et al. | 707/736 |
| 2010/0299326 A1 | 11/2010 | Germaise | 707/728 |
| 2011/0208801 A1 | 8/2011 | Thorkelsson et al. | |
| 2012/0254188 A1 | 10/2012 | Koperski et al. | 707/740 |
| 2013/0124510 A1 | 5/2013 | Guha | 707/723 |

FOREIGN PATENT DOCUMENTS

| | | |
|---|---|---|
| EP | 0 597 630 | 5/1994 |
| WO | 00/14651 | 3/2000 |
| WO | 00/57302 | 9/2000 |
| WO | 01/22280 | 3/2001 |
| WO | 01/80177 | 10/2001 |
| WO | 02/27536 | 4/2002 |
| WO | 02/33583 | 4/2002 |
| WO | 03/017143 | 2/2003 |
| WO | 2004/053645 | 6/2004 |
| WO | 2004/114163 | 12/2004 |
| WO | 2006/068872 | 6/2006 |

OTHER PUBLICATIONS

Joseph Hassell et al., "Ontology-Driven Automatic Entity Disambiguation in Unstructured Text", 2006, ISWC, pp. 44-57.*
Levon Lloyd et al., "Disambiguation of References to Individuals", Oct. 28, 2005, IBM, pp. 1-9.*
Abraham, "FoXQ—Xquery by Forms," Human Centric Computing Languages and Environments, IEEE Symposium, Oct. 28-31, 2003, Piscataway, New Jersey, pp. 289-290.
Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.
Feldman et al., "Text Mining at the Term Level," *Proc. of the 2nd European Symposium on Principles of Data Mining and Knoweldge Discovery*, Nantes, France, 1998, pp. 1-9.
Ilyas et al., "A Conceptual Architecture for Semantic Search Engine," IEEE, INMIC, 2004, pp. 605-610.
Jayapandian et al., "Automating the Design and Construction of Query Forms," Data Engineering, Proceedings of the 22nd International Conference IEEE, Atlanta, Georgia, Apr. 3, 2006, pp. 125-127.
Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.
Liang et al., "Extracting Statistical Data Frames from Text," SIGKDD Explorations 7(1):67-75, Jun. 2005.
Littman et al., "Automatic Cross-Language Information Retrieval Using Latent Semantic Indexing," *In Grefenstette, G. editor*, Cross Language Information Retrieval. Kluwer, 1998, pp. 1-11.
Nagao et al., "Semantic Annotation and Transcoding: Making Web Content More Accessible," *IEEE Multimedia, IEEE Computer Society*, US, 8(2):69-81, Apr. 2001.
Nguyen et al., "Accessing Relational Databases from the World Wide Web," SIGMOD Record ACM USA, Jun. 1996, vol. 25, No. 2, pp. 529-540.
Pohlmann et al., "The Effect of Syntactic Phrase Indexing on Retrieval Performance for Dutch Texts," *Proceedings of RIAO*, pp. 176-187, Jun. 1997.
Rasmussen, "WDB—A Web Interface to Sybase," Astronomical Society of the Pacific Conference Series, Astron. Soc. Pacific USA, 1995, vol. 77, pp. 72-75, 1995.
Sneiders, "Automated Question Answering Using Question Templates That Cover the Conceptual Model of the Database," *Natural Language Processing and Information Systems, 6th International Conference on Applications of Natural Language to Information Systems*, Revised Papers (Lecture Notes in Computer Science vol. 2553) Springer-Verlag Berlin, Germany, 2002 vol. 2553, pp. 235-239.
Ruiz-Casado et al., "From Wikipedia to Semantic Relationships: a Semi-Automated Annotation Approach" 2006, pp. 1-14.
Florian et al., "Named Entity Recognition through Classifier Combination", 2003, IBM T.J. Watson Research Center, pp. 168-171.
Wu et al., "A Stacked, Voted, Stacked Model for Named Entity Recognition", 2003, pp. 1-4.
Google "How to Interpret your Search Results", http://web.archive.org/web/2011116075703/http://www.google.com/intl/en/help/interpret/htht, Mar. 27, 2001, 6 pages.
Razvan Bunescu et al., "Using Encyclopedia Knowledge for Named Entity Disambiguation". 2006, Google, pp. 9-16.
Silviu Cucerzan, "Large-Scale Named Entity Disambiguation Based on Wikipedia Data", *Proceedings of the 2007 Joint Conference on Empirical Methods in Natural Language Processing and Computational Natural Language Learning*, Prague, Jun. 2007, pp. 708-716.
Bunescu "Learning for Information Extraction: From Named Entity Recognition and Disambiguation to Relation Extraction", *The Dissertation Committee for Aug. 2007*, The University of Texas at Austin, pp. 1-150.
Hassell et al., "Ontology-Driven Automatic Entity Disambiguation in Unstructured Text", *Large Scale Distributed Information Systems (LSDIS) Lab Computer Science Department*, University of Georgia, Athens, GA 30602-7404, ISWC, 2006, LNCS 4273, pp. 44-57.
Lloyd et al.,"Disambiguation of References to Individuals", IBM Research Report, Oct. 28, 2005, pp. 1-9.
Dhillon et al., "Refining Clusters in High Dimensional Text Data," 2002.
Perone, Christian, Machine Learning:: Cosine Similarity for Vector Space Models (Part III), Pyevolve.sourceforge.net/wordpress/?p=2497, Sep. 12, 2013.
Rao et al., "Entity Linking: Finding Extracted Entities in a Knowledge Base," Jul. 12, 2012, *Multi-source, Multilingual Information Extraction and Summarization Theory and Applications of Natural Language Processing*, 2013, 21 pages.

* cited by examiner

Fig. 2

NLP-BASED ENTITY RECOGNITION AND DISAMBIGUATION

TECHNICAL FIELD

The present disclosure relates to methods, techniques, and systems for entity identification using natural language processing and, in particular, to methods and systems for recognizing and disambiguating named entities using natural language processing, knowledge repositories, and/or other contextual information.

BACKGROUND

With the proliferation of information generated daily and accessible to users over the Web, the need for intelligent electronic assistants to aid in locating and/or discovering useful or desired information amongst the morass of data is paramount. The use of natural language processing to search text to correctly recognize people, places, or things is fraught with difficulties. First, natural language is ambiguous. Almost every English word or phrase can be a place name somewhere in the world or a name of a person (i.e., a "person name"). Furthermore, many entities share the same name. For example, there are more than 20 cities named "Paris" in the United States. A person named "Will Smith," could refer to the Hollywood movie actor and musician, the professional football player in the NFL, or many other people. Recognizing non-celebrity names has become more important with the exponential growth of the Web content, especially user created content such as blogs, Wikipedia, and profiles on social network sites like MySpace and FaceBook. Second, an entity could be mentioned or referred to in many different ways (e.g., pronouns, synonyms, aliases, acronyms, spelling variations, nicknames, etc.) in a document. Third, various knowledge sources about entities (e.g. dictionary, encyclopedia, Wikipedia, gazetteer, etc.) exist, and the size of these knowledge bases are extensive (e.g. millions of person names and place names). The sheer quantity of data is prohibitive for many natural language processing techniques.

BRIEF DESCRIPTION OF THE DRAWINGS

FIG. 2 is an example screen display of further use of an identified entity to obtain additional information.

DETAILED DESCRIPTION

Figure 1:
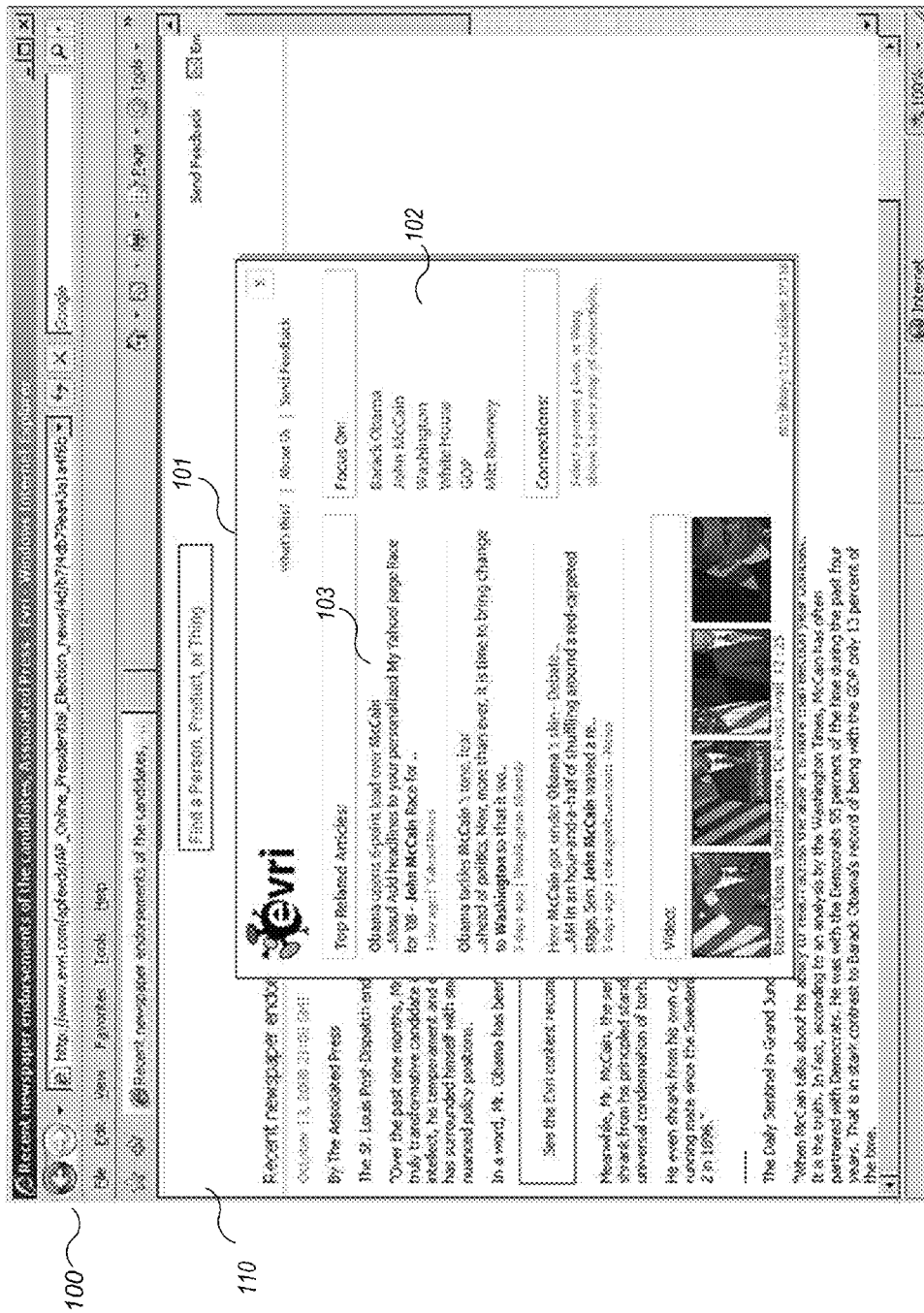
FIG. 1 is an example screen display of an example pop-up window that incorporates ERDS functionality to identify entities in an underlying news article.

Embodiments described herein provide enhanced computer- and network-assisted methods, techniques, and systems for recognizing and disambiguating entities in arbitrary text using natural language processing. Example embodiments provide an entity recognition and disambiguation system (an "ERDS") and process that, based upon input of a text segment, automatically determines (e.g., makes a best analysis of identifying) which entities are being referred to by the text using both natural language processing techniques and analysis of information gleaned from contextual data in the surrounding text. The text segment may comprise a portion or all of a document, and may be part of a larger composite collection. In at least some embodiments, supplemental or related information that can be used to assist in the recognition and/or disambiguation process can be retrieved from knowledge repositories such as an ontology knowledge base.

Entities refer generally herein to people, places, or things. Entities are determined based upon recognizing mentions of entities and disambiguating those that potentially correspond to more than one entity. Entity disambiguation refers to the process for differentiating which entity is being referred to in a given piece of text when a recognized entity may correspond to more than one entity. The recognition and disambiguation process may further set up a correspondence between the determined entities and their corresponding entries stored in a knowledge repository and return a list of identified entities. In addition, the identified entities may be ranked and/or grouped based on their relevance/importance to the input text.

Once the entities in the input text are identified, the results of the recognition and disambiguation process can be used to present useful information such as to summarize information in an underlying Web page, to present supplemental related data, etc. For example, a listed of ordered or ranked entities can be provided along side information presented for other purposes, such as in conjunction with other information presented to a user while perusing web pages to research or otherwise discover useful information. In addition, links to other related information can be provided based upon the knowledge acquired by the ERDS while performing entity identification. For example, the coordinates of place names could be retrieved, and, as a result the recognized place names could be displayed on a map. Also, the identified entities in a document (e.g., their links) could be automatically highlighted so that further information on the entities could be easily accessed (e.g., the links could automatically point to knowledge source entries). Further, better summarization of document content could be provided, for example, by listing the "top" ranked entities in juxtaposition to the document, targeting advertising toward the top ranked entities, etc. A variety of other uses could be similarly employed to integrate the results of entity recognition and disambiguation techniques.

The ERDS (or entity recognition and disambiguation process) may be made available as a standalone module such as a widget, pop-up window, etc., embedded in other programs or modules, provided as a service, accessed via an application programming interface ("API"), etc. In other contexts, the recognition and disambiguation process used in an ERDS may be incorporated in powerful indexing and search tools, such as those used to provide relationship searches that find information based upon natural language analysis rather than merely keyword searching.

FIG. 1 is an example screen display of an example pop-up window that incorporates ERDS functionality to identify entities in an underlying news article. In FIG. 1, using a Web browser 100, a user has navigated to a page 110 that displays a recent newspaper article from Associated Press, entitled "Recent newspaper endorsements of the candidates." The user has selected (for example, by means of an input device such as a mouse) an icon (covered up) that provides a link to a widget, here a pop-up window 101, that incorporates ERDS functionality to recognize and disambiguate where needed the topmost entities described in the article. In pop-up window 101, the list of recognized entities 102 is provided as possible further focuses for the user. The list 102 is shown ranked in an order. In some embodiments, the ranked order may be based upon a frequency that is not just based on the article, but possibly based upon other references to the entities (e.g., in other news articles, frequency of user request, etc.) elsewhere in the universe being examined. The Top Related Articles section 103 provides links to other articles relating to the recognized entities shown in the list 102. These other articles may be ordered based upon factors such as popularity and what is most current.

Figure 2:
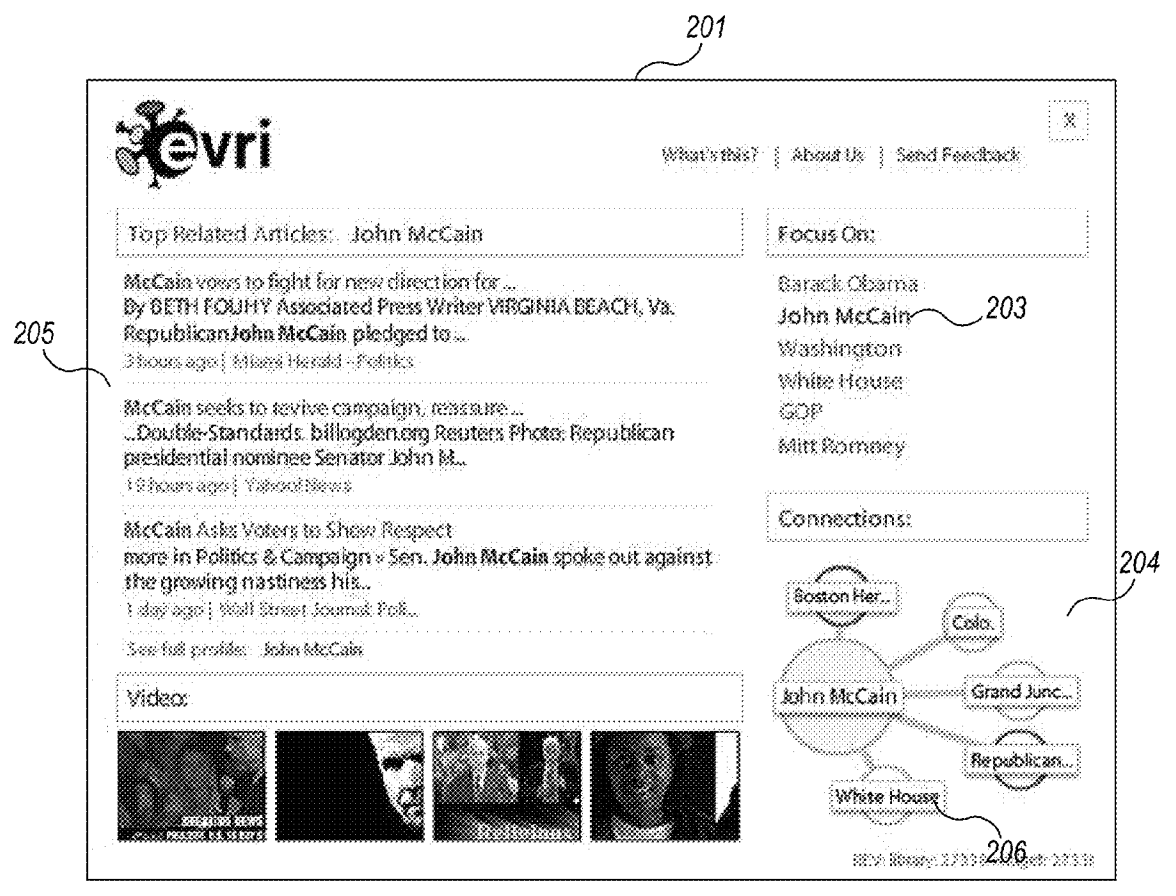

FIG. 2 is an example screen display of further use of an identified entity to obtain additional information. In this case, the user has selected one of the recognized entities, the John McCain entity 203. In response, the widget 201 that incorporates the ERDS techniques presents a connections diagram 204 of other entities that the selected entity 203 is connected to. In addition, the Top Related Articles section 205 is modified to reflect the changed entity selection. Further selection of one of the connected entities in connections diagram 204, such as connected entity 206, can further cause the articles shown in section 205 to change. Accordingly, widgets 101 and 201 may be used to perform research, discover further useful information, etc, without the user explicitly needing to enter search commands or keywords in a search language.

Additional example embodiments that include different user interfaces for presenting and manipulating determined entities and/or the information connected to such entities are described in co-pending U.S. patent application Ser. No. 12/288,349, entitled NLP-BASED CONTENT RECOMMENDER, filed Oct. 16, 2008, and issued as U.S. Pat. No. 8,700,604 on Apr. 15, 2014, and herein incorporated by reference in its entirety.

Figure 3:
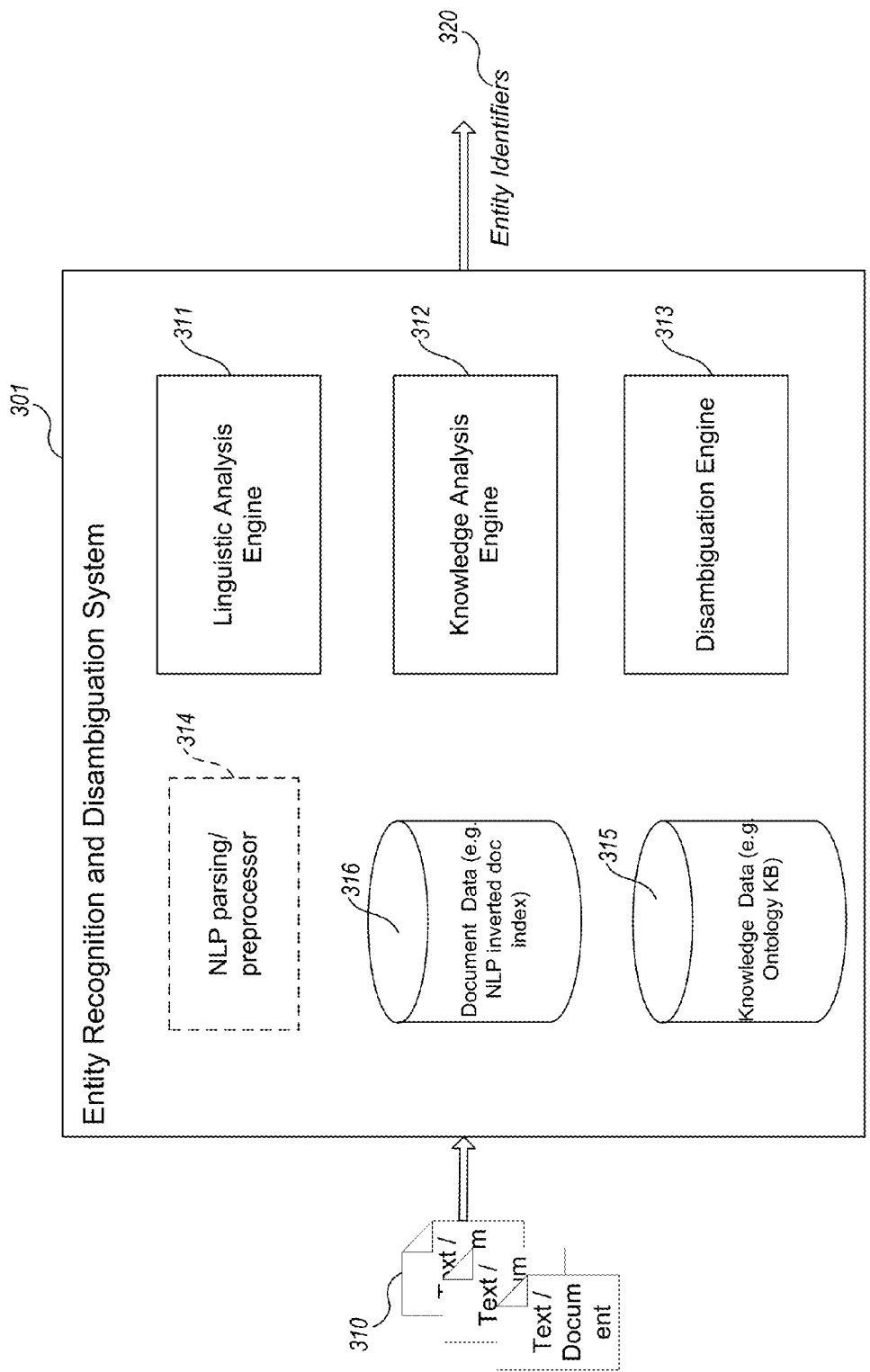
FIG. 3 is an example block diagram of components of an example Entity Recognition and Disambiguation System.

FIG. 3 is an example block diagram of components of an example Entity Recognition and Disambiguation System. In one embodiment, the Entity Recognition and Disambiguation System comprises one or more functional components/modules that work together to automatically determine which entities are referred to in specified text (e.g., from input documents). These components may be implemented in software or hardware or a combination of both.

In FIG. 3, the Entity Recognition and Disambiguation System 301 comprises a linguistic analysis engine 311, a knowledge analysis engine 312, a disambiguation engine 313, a document data repository 316, and a knowledge data repository 315. The ERDS 301 may optionally comprise an NLP parsing/preprocessor, potentially as a separate component, especially in instances where a third party or off-the-shelf processor is integrated into the system. The ERDS analyzes text segments from text documents 310 to automatically determine the various entities contained in them, and potentially outputs entity identifiers 320.

In some embodiments, the entity identifiers 320 are stored as links in the text documents 310 and setup correspondences with entity information stored in one or more knowledge repositories 315, e.g., ontology knowledge bases. In addition, in some embodiments, the entity information is stored and indexed in the document data repository 316, for example to assist in performance of relationship searching, along with other data indexed from the documents 310. This is particularly useful in embodiments that embed the ERDS as part of a larger document storage and indexing system for searching. The linguistics analysis engine 311 receives text from the text documents 310 which has been potentially preprocessed by preprocessor 314 and determines characteristics about the entities mentioned (but not yet resolved) in the documents 310. The knowledge analysis engine 312 matches these characters to find possible candidate entities in a vast array of knowledge information, represented in part by the knowledge data 315. The disambiguation engine 315 resolves which possible candidate entity is the most likely entity being referred to in the text, and returns indications of the identified (resolved) entities.

One or more embodiments of an ERDS may incorporate an existing natural language processing technology and relationship search technology, called InFact®. The InFact® NLP-based relationship search technology, now referred to as the Evri relationship search technology, is described in detail in U.S. patent application Ser. No. 11/012,089, filed Dec. 13, 2004, which published on Dec. 1, 2005 as U.S. Patent Publication No. 2005/0267871A1, and which is hereby incorporated by reference in its entirety. The InFact®/Evri relationship search and indexing technology defines data structures, techniques, and systems for natural language processing that preprocess and store document information in one or more annotated phrase, clause, or sentence-based indexes. The annotations store tag-based information, along with the terms of a clause or sentence, so that existing keyword-based search engines can be leveraged to perform natural language based processing instead of simple keyword searching. The tag-based information may include one or more of parts-of-speech tags, grammatical role tags, ontological information, entity tags, and other types of information. The InFact®/Evri relationship search technology also defines methods, systems, and techniques for performing relationship queries, as opposed to traditional keyword-based searching. These relationship queries leverage NLP to allow users to discover information regarding how a particular entity relates or is otherwise associated with other entities. Accordingly, the recognition and disambiguation process used in an ERDS also may be incorporated into an InFact®/Evri text analysis and indexing system, and can be invoked during the indexing of documents to identify and store entity related information.

Figure 4:
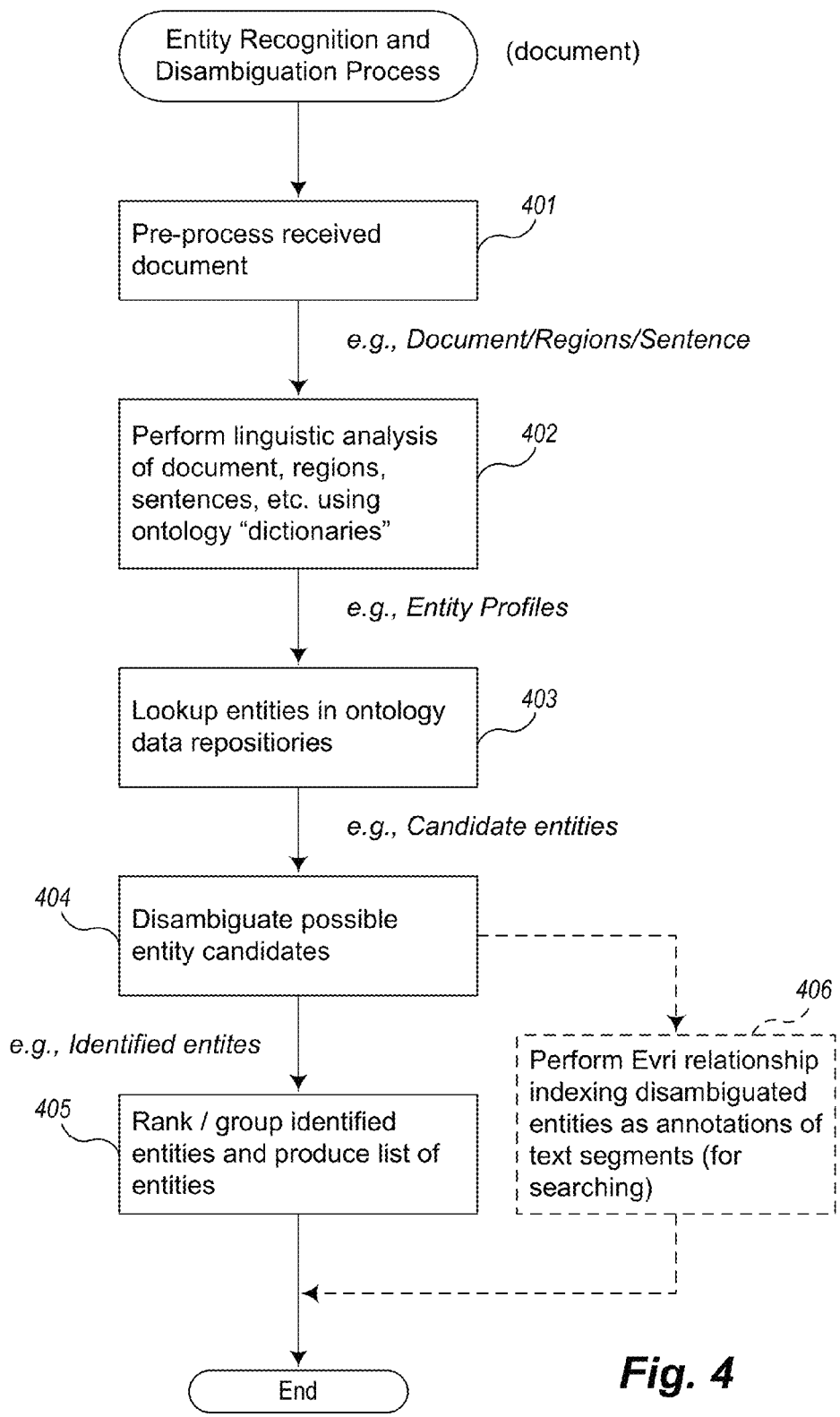
FIG. 4 is an example block diagram of an overview of an example entity recognition and disambiguation process used by an example embodiment of an Entity Recognition and Disambiguation System.

FIG. 4 is an example block diagram of an overview of an example entity recognition and disambiguation process used by an example embodiment of an entity recognition and disambiguation system. The ERDS techniques addresses some of the challenges posed by recognizing entities, for example within the voluminous amounts of information promulgated by the Web, by disambiguation based upon InFact®/Evri NLP techniques, normalization of variations of languages, especially the resolution of coreferences of same entities, and development of an ontology representation and repository that provides fast and scalable access to knowledge sources about entities.

In block 401, the process performs natural language parsing and linguistic analysis (preprocessing) of each sentence in the input document to turn the text into structured information. The term "document" as used herein refers to any portion or all of one or more text segments.

In block 402, it detects/recognizes potential entity names by combining evidence from multiple levels, based on a more sophisticated syntactic and semantic analysis as opposed to simple keyword-based matching. As the result, a profile is built for each entity mentioned in the text that characterizes the entity's properties based upon the document content.

Then, in block 403, the process performs an ontology lookup on each potential entity name using an ontology lookup service. The ontology lookup service provides the capability, given a name and its attributes, to retrieve all matching ontology entries. To perform this processing, for each detected entity, a search is performed against the ontology repository, which is likely to return multiple matches (or candidate entries in the ontology repository that potentially match the name/entity profile). The result of this processing is one or more candidate entities.

In block 404, the process then performs an entity disambiguation process for the candidate entries. The entity disambiguation step determines the correct entity that the text is likely referring to, from among the multiple candidate entries in the ontology (or determines that none of the candidate entries is correct). This disambiguation process is performed by examining the candidate's attributes specified in the ontology and comparing them to contextual information extracted from the text (i.e., the profiles derived from the text). What results is one or more identified entities.

Then, in block 405, the identified (disambiguated) entities are ranked based on certain criteria (e.g., frequency of occurrence in the document) or grouped based on their common characteristics (e.g., places that belong to same region or people with the same profession). The entity recognition and disambiguation process for the received input is then complete.

In addition, in some embodiments that integrate these techniques with InFact®/Evri relationship search and indexing technology, in block 406, the matching ontology entries (to the identified entities) are stored, as annotations of phrases within the sentence-level indices, to support queries against them. (They may also be stored at other level indices in some other embodiments.) The InFact®/Evri search and indexing technology supports queries of the annotated entities and their relationships. To do so, the indexing and storage mechanism stores each sentence of a document as a series of clauses, annotated by one or more tags, wherein the tags may include entity tag information, grammatical role information, syntactic (parts-of-speech) roles, etc. The structure and use of these inverted indexes is described further in U.S. Patent Publication No. 2005/0267871A1.

As illustrated in FIG. 4, the entity recognition and disambiguation process generates several intermediate results in the process of identifying entities. The following example is illustrative:

Example Text:
Carolina quarterback David Carr was sacked by Saints defensive end Will Smith in the first quarter. Smith leads the Saints in sacks. He was a Pro-Bowl starter last year.

The following Table 1 shows the result of processing after the linguistic analysis:

TABLE 1

Linguistic Analysis

| Subject: Modifier | Action: Modifier | Object: Modifier |
|---|---|---|
| Will Smith [Person name]: defensive end, Saints | sack: in first quarter | David Carr [Person name]: Carolina, quarterback |
| Will Smith [Person name] | lead: in sack | Saints [Organization] |
| Will Smith [Person name] | be | starter: Pro-Bowl, last year |

In Table 1, note that Will Smith is tagged as a person name. The three coreferences ("Will Smith", "He", and "Smith") are resolved and linked together so that they identify the same entity.

Next (after block 402), an entity profile is constructed for Will Smith. The entity profile describes the characteristics of the entity as specified in the text. Table 2 shows the constructed entity profile.

TABLE 2

Entity Profile

| Actions | Modifiers | Related Entities |
|---|---|---|
| sack, lead | defensive end, starter | Saints, Carolina, David Carr, Pro-Bowl |

This entity profile is then looked up in the ontology data repositories. Using the name "Will Smith" as query, the process finds three matches (candidate entities) from the ontology repository (after block 403) as shown below in Table 3. Each entry in the ontology specifies a number of attributes (i.e., type, role, related entities). Other attributes may be available.

TABLE 3

Candidate Entities

| Name | Type/Role | Related Entities |
|---|---|---|
| Will Smith | Person/Movie Actor | Independence Day, Men in Black, Ali, |
| Will Smith | Person/Football Player | New Orleans Saints, NFL, Ohio State University |
| Will Smith | Person/Cricket player | England, Nottinghamshire |

Finally, the candidate entities are disambiguated. The disambiguation process (block 404) matches Will Smith's profile collected from the text against the three ontology matching entries, and determines that Will Smith the football player is the correct entity the text refers to. Multiple algorithms are available to make this determination. A few of them are described further below. The following identified entity shown in Table 4 results.

TABLE 4

Disambiguation Result (Identified Entity)

| Will Smith | Person/Football Player | New Orleans Saints, NFL, Ohio State University |
|---|---|---|

Example embodiments described herein provide applications, tools, data structures and other support to implement an entity recognition and disambiguation system and/or process to be used for assisting in the locating and understanding of relevant information. Other embodiments of the described techniques may be used for other purposes.

In the following description, numerous specific details of one example embodiment are set forth, such as data formats and code sequences, etc., in order to provide a thorough understanding of the described techniques. The described approaches and algorithms may be used alone or in combination to implement an NLP-based recognition and disambiguation system. In some embodiments both natural language processing and knowledge based approaches are used. In other embodiments only some of the approaches or capabilities are incorporated. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Also, although certain terms are used primarily herein, other terms could be used interchangeably to yield equivalent embodiments and examples. For example, it is well-known that equivalent terms in the natural language processing field and in other similar fields could be substituted for such terms as "document," "text," etc. In addition, terms may have alternate spellings which may or may not be explicitly mentioned, and all such variations of terms are intended to be included.

As described in FIGS. 3 and 4, a primary function of an ERDS is to recognize and disambiguate entities present in specified text. This function may be provided, for example, as part of an indexing and storage process for performing relationship searches, such as available through the InFact®/Evri NLP relationship search technology. Once the entities are "resolved" (recognized and disambiguated), appropriate indications of the entities (e.g., entity tags) may be stored in the indexes that represent the clause/sentence/document structures, so that matches against those entities may be found efficiently.

Additional detailed information on the InFact®/Evri indexing and storage techniques and use of them for searching structured and unstructured data is available in several patents, publications and patent applications, including U.S. Pat. No. 7,398,201; U.S. Patent Publication No. 2005/0267871A1; U.S. Patent Publication No. 2007/0156669A1; and U.S. patent application Ser. No. 12/049,184, filed Mar. 14, 2008, which are incorporated herein by reference in their entireties.

The following sections describe each aspect of the entity recognition and disambiguation process and ERDS component interactions in more detail.

Pre-Processing

As mentioned in block 401 of FIG. 4, the input text segment (document, etc.) is pre-processed, for example, using the NLP parsing/preprocessor 314 of FIG. 3. The preprocessor takes input text and produces one or more data structures that contain the structure of regions (e.g., paragraphs), sentences, as well as associated meta-tags (e.g., publisher, URL, topic categories such as Politics, Entertainment, etc.)

Entity Recognition Based Upon Linguistic Analysis

Figure 5:
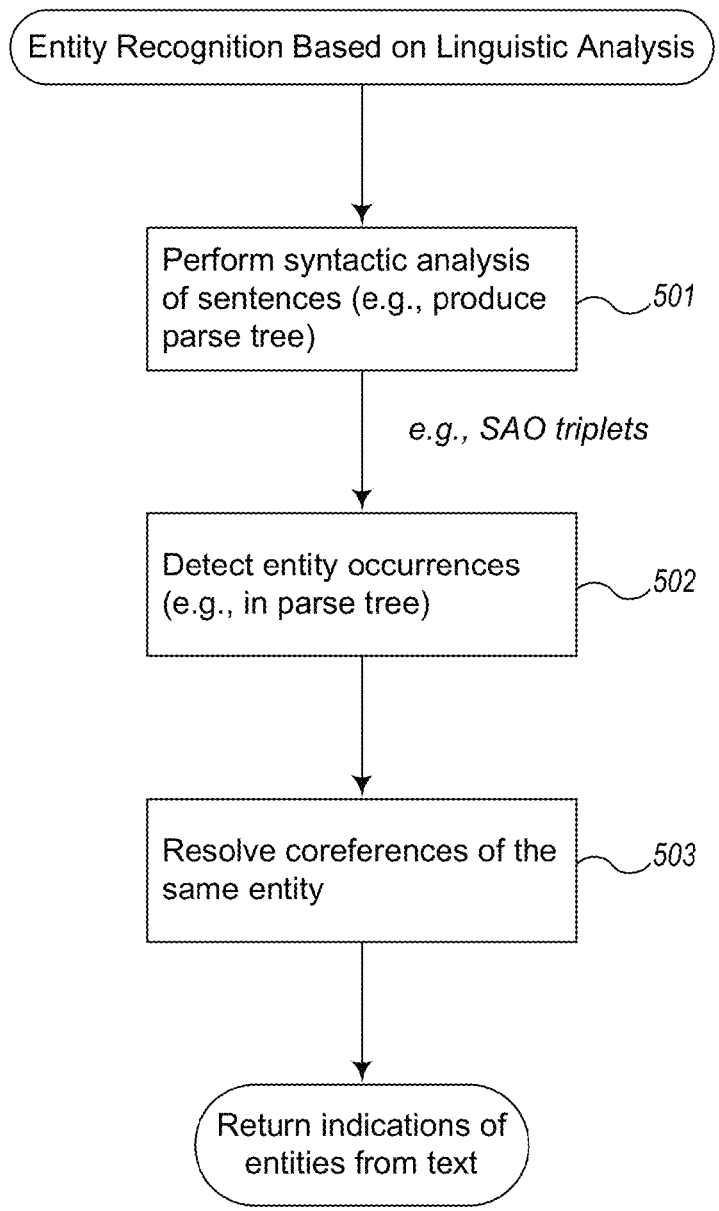
FIG. 5 is an example flow diagram of the sub-steps of the entity recognition process based upon linguistic analysis of the input text.

Once pre-processed, the resulting structures are sent to the linguistic analysis engine, for example engine 311 of FIG. 3, to recognize all of the entities in the inputted text (see, e.g., block 402 of FIG. 4). FIG. 5 is an example flow diagram of the steps of the entity recognition process based upon linguistic analysis of the input text. The entity recognition process detects entities mentioned in the input text, and links together multiple occurrences of same entity. The process consists of three sub-steps. In step 501, syntactic analysis of sentences (e.g., producing a parse tree of each sentence) is performed. In step 502, the process detects entity occurrences in the syntactic structure resulting from step 501 (the parse tree). In step 503, the process resolves coreferences of the same entity, for example determines which pronouns refer to which entities. Each of these steps is described in more detail next.

Syntactic Analysis

Given a sentence (or clause), a syntactic parser (e.g., the InFact®/Evri dependency parser) is used to produce a parse tree. A parse tree represents the syntax of a sentence as a tree structure and typically captures the following information:

Part-of-speech tags (e.g., noun, adjective, preposition, verb, etc.)

Grammatical roles (e.g., subject, object, verb, etc.)

Multi-word Phrase structures, such as noun phrases

Figure 6:
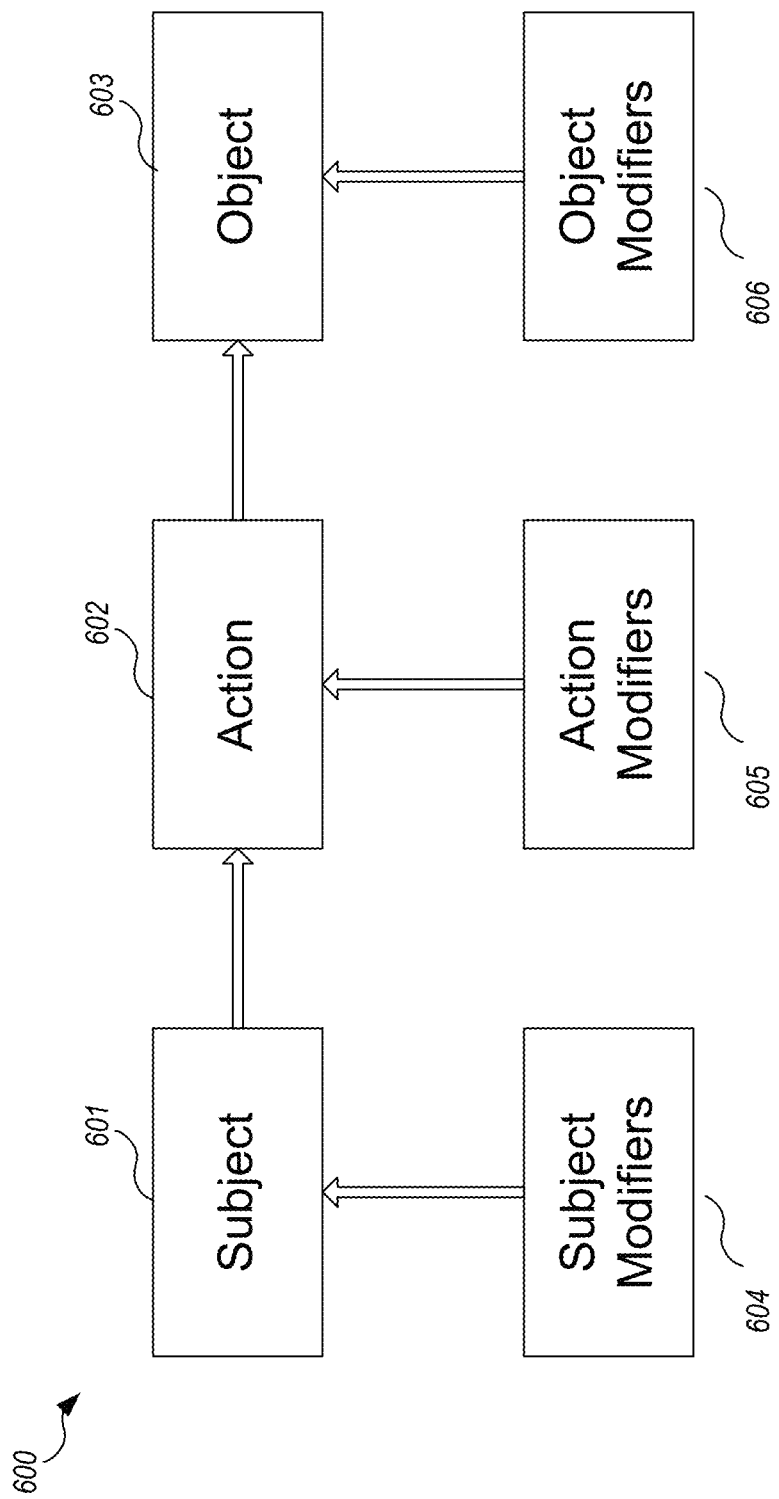
FIG. 6 is an example illustration of SAO triplets along with descriptive modifiers.

When used with a dependency parser (such as the InFact®/Evri dependency parser), the produced parse tree is a dependency tree, which is a type of parse tree representation. It represents the whole parse tree as a list of head-modifier relations (e.g., verb-subject relations, adjective-noun modifier relations, etc.). As a result, each sentence can be decomposed into one or more of the subject-action-object triples (SAO triplets), along with their descriptive modifiers. FIG. 6 is an example illustration of SAO triplets along with descriptive modifiers. SAO triplet 600 contains a subject 601, an action 602, and an object 603, along with their respective modifiers 604, 605, and 606.

The descriptive modifiers 604 and 606 include immediate modifiers of a noun, including appositive, nominative, genitive, prepositional, adjective modifiers, as well as normalized long distance dependencies, e.g., predicate nominative (the is-a relation). The subject-action-object event triplets indicates entities' roles in an event (as source or target) and their interactions with other entities.

Figure 7:
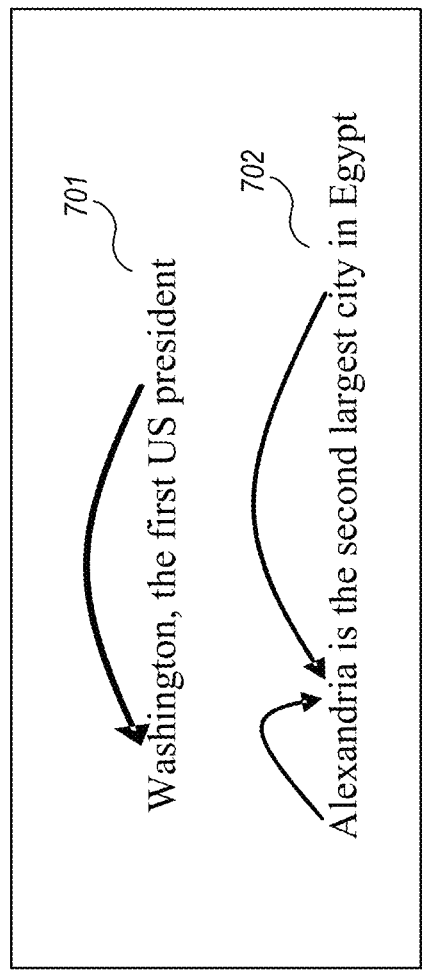
FIG. 7 is a schematic illustration of long-distance dependency recognition.

One of the benefits of using the InFact®/Evri dependency tree parsing is that it explicitly handles long-distance dependency in a normalized way. FIG. 7 is a schematic illustration of long-distance dependency recognition. In the examples shown in FIG. 7, in clause 701 "president" is identified as direct modifier of head noun "Washington," even though there are many words between the pair of words. Similarly, in clause 702 "city" is a direct modifier of the head noun "Alexandria." These kind of long-distance descriptive modifier relations are difficult to capture by methods based on a finite-state model, such as regular expression, n-gram language model, or Hidden Markov Model, which represent sentence structure as a sequence of words. Accordingly, use of the InFact®/Evri dependency tree parsing improves accuracy of entity recognition.

Entity Detection of Proper Nouns

Using the phrases and syntactic structures (the SAO triplets) produced by the previous stage (step 501 of FIG. 5), the entity recognition process then performs detection of proper nouns by examining evidence from multiple levels, some examples of which are described here. Proper nouns (also called proper names) are nouns representing unique entities (such as "London" or "John"), as distinguished from common nouns which describe a class of entities (such as city or person). This entity detection/recognition step detects the proper nouns and assigns them into a number of general categories (e.g., people, place, organization, date, number, money amount, etc.). Other categories could be similarly supported.

More specifically, this step of entity recognition first rules out words or phrases with part-of-speech tags other than noun, such as verb, preposition, and adjective. Many words have multiple senses (e.g., a word could be used as a verb or noun). The recognition process resolves such ambiguity through part-of-speech tagging during the sentence parsing process.

Proper names are usually capitalized in English. They also have certain internal structures (e.g., a person name may have the structure of given name followed by family name). The entity detection step (step 502) applies lexical analysis to the words and phrases (from the produced dependency tree) that have not been ruled out to detect proper names from phrases. The analysis is based on a combination of dictionary entries and a set of regular expression patterns. Examples of such patterns that are recognized include:

- A set of common given names and family names can be collected in the dictionary. Then, if a recognized phrase (e.g., "George Vancouver") matches a pattern such as <given name> <capitalized word>, the entity recognition process can tag the phrase as a person name.
- A set of geographic keywords indicating place names (e.g., lake, mountain, island) can be collected in the dictionary. Then, the entity recognition process can recognize patterns such as <capitalized word> <geographic keyword> to identify place names (e.g., "Vancouver Island").
- Similarly, organization names can be identified by organization-related keywords appearing in the names (e.g., recognition of the keyword "University" in the phrase "University of Washington").

Furthermore, the entity recognition process can recognize certain types of proper names based on their modifiers, by detecting occurrence of the above mentioned keyword indicators. For example, title words (e.g., senator, congressman, president) present in modifiers usually indicate the head noun is a person name.

In contrast, the examples below illustrate that the word "Sofia" can be tagged as a city based on its modifiers, instead of as a person name:

Appositive modifier: "Sofia, capital city of Bulgaria"
Predicate modifier: "Sofia is the capital of Bulgaria"
Nominal modifier: "Bulgarian capital Sofia"
Names appearing together through conjunctions (e.g., "and," "or") or as a list, more than likely belong to the same entity type. For example, if an unknown name appears together with a list of person names, the entity recognition process labels the unknown name as a person name. Similarly, given a list of names "Moses Lake, George, Wenatchee," the entity recognition process determines that "George" is likely a place name rather than a person name based on the recognition that its conjunctions are place names.

Coreference Resolution

An entity is often referred to in many different ways and at different locations in a segment of text. The entity recognition process applies a document-level coreference resolution procedure (step 503) to link together multiple occurrences (mentions) that designate the same entity.

The types of coreferences handled may include one or more of:

Names and aliases:
In a given document, an unambiguous name is often mentioned in the beginning, then some form of acronyms or aliases are used in the rest of the document. These aliases are often localized, and may not be available from a domain lexicon or have ambiguous meanings. For example, "Alaska" refers to "Alaska Airlines;" "Portland" refers to "Portland, Me.;" and "UT" refers to "University of Texas" instead of the state of "Utah."

Definite noun phrase anaphora (e.g., "Washington" is referred later as "the state"); and
Pronoun anaphora (it, they, which, where, etc.).

For each potential anaphora (e.g., each pronoun), the entity recognition process determines its antecedent (the entity the anaphora refers to) using the following steps:

1. Determine the proper context for this kind of anaphora. For example, the context for a pronoun is usually no more than two sentences.
2. Inspect the context surrounding the anaphora (e.g., pronoun) for candidate antecedents (nouns and the entities to which they refer) that satisfy a set of consistency restrictions. For example, if the current pronoun is "she" then only the Person entities with gender "female" or "unknown" will be considered as candidate entities. Each antecedent noun at this point has a corresponding entity associated with it from the other analysis sub-steps.
3. Assign scores to each antecedent based on a set of weighted preferences (e.g., distance between the antecedent and the anaphora in the parse tree).
4. Choose as the candidate entity for the pronoun, the entity that corresponds to the antecedent noun with the highest score.

After performing syntactic analysis, entity detection of proper nouns, and resolving coreferences, the entity recognition process has determined to which named entities, the text probably refers. These are referred to as recognized entities or recognized named entities. It will be understood that variations of these steps could also be supported, such as different rules for determining which antecedent is likely the best candidate entity.

Building Entity Profiles

Again referring to FIG. 4, once one or more named entities have been recognized in the text, corresponding entity profiles are built (as part of block 402) by processing each named entity in relation to the document to determine characteristics for each named entity. It is from these characteristics and other information that the entity recognition and disambiguation process (hence the ERDS) can decipher which precise entity is being referred to. In one example embodiment, for each entity, the ERDS builds an entity profile of the named entity by collecting the following information by examining each mention (direct, e.g., by name, or indirect, e.g., through a pronoun) of the entity in the document:

list of descriptive modifiers of the entity (e.g. "Will Smith, the footballplayer)
list of actions where the entity is a subject (e.g. "Will Smith starred in the movie)
list of actions where the entity is a object (e.g. "arriveat JFK")
list of other entities that interact with the given entity (e.g. "Will Smith plays for the NewOrleansSaints")
collection of general categories assigned to the entity (i.e. Person, Location, Organization), for example, by the InFact®/Evri dependency parser.

In other embodiments less or more information may be collected for each mention of an entity.

Once the context information is collected, the ERDS further assigns more specific roles (e.g., politician, musical artist, movie actor, tennis player, etc.) to each entity profile. There are several ways to gain additional information that assists with assigning roles. For example, title words such as "mayor", "senator", "presidential candidate" appearing as descriptive modifiers likely indicate that the entity has been used in a "politician" role. Roles can also be indicated by the actions that entities are involved in. For example, in the clause "JFK was assassinated," JFK is a person name, while in the clause "arrive at JFK," JFK is more likely a place name.

In addition, the collected information for an entity can be compared to known roles in order to match the entity to its most likely role (i.e., category). Table 5 below illustrates two clusters of people based on their action patterns collected from a set of news articles.

TABLE 5

| person name with similar actions | common action profiles |
|---|---|
| steve young, joe montana, jim everett, jim mcmahon, steve bono, troy aikman, john elway, phil simms, mike pawlawski, mark vlasic | throw, play, complete, get, start, lob, finish, share, run, sustain, wear, seem, come in, take, recover, rally, scramble, spot, find, make, convert, lead, game, replace, pick up |
| andre agassi, steffi graf, john mcenroe, monica seles, martina navratilova, boris becker, ivan lendl, michael chang, stefan edberg, pete sampras, gabriela sabatini, jimmy connors, chris evert, Jennifer capriati, becker, jim courier, andres gomez | play, beat, win, defeat, lose, overcome, reach, wear, route, take, rally, withdraw, skip, serve, get, come, make, hit, miss, throw, force, pull, begin, need, rocket |

In Table 5, it can be observed that football quarterbacks and tennis players are distinguishable based on their action patterns. Accordingly, given an unknown person name, if the entity's associated actions match closer to, for example, the action patterns of known football players, then this person is more likely to refer to a football player than other types of players.

Using this technique, the ERDS can assign entity profiles to one or more predefined categories (roles in this scenario) using inductive learning techniques to automatically construct classifiers based on labeled training data. The training data is a set of entities that have been manually assigned corresponding categories.

Therefore, for each category, there is a set of positive examples, as well as negative examples (entities that don't belong to a particular category). Each profile can then be represented as a feature vector of terms collected from the entity's modifiers and actions. The terms can be weighted in a number of ways, such as:
  binary—a term either appears or does not appear in a profile
  frequency—number of times a term appears in a profile
  other type of weighting scheme Table 6 below illustrates an example of two feature vectors collected from a segment of text. In this example, the number in each cell indicates the frequency the term (column) occurs in the profile of an entity (row) collected from the text. Table 6 demonstrates that the action profile of an entity named Peyton Manning is more similar to those of known quarterbacks (see example above) than to the profile of Will Smith.

TABLE 6

| | pass | lead | start | tackle | play | complete | throw |
|---|---|---|---|---|---|---|---|
| Peyton Manning | 2 | 2 | 1 | 0 | 1 | 1 | 3 |
| Will Smith | 0 | 1 | 1 | 2 | 1 | 0 | 0 |

Given a set of labeled feature vectors, the ERDS builds a binary classifier (true or false) for each category (e.g., role). The binary classifier can then be directly compared to a generated entity profile to determine whether the entity profile "is one" or "is not one" of a designated category. A number of machine learning algorithms can be used to construct the classifiers, such as Nearest Neighbors, Decision Trees, Support Vector Machines, Maximum Entropy Models, and Rocchio's. In one embodiment, the building of category classifiers is done before new text is processed.

When processing a text segment, the ERDS performs the same feature extraction on each recognized entity to generate feature vectors. Then, the trained classifiers are applied to the extracted feature vectors to determine matches. Corresponding categories are then assigned to each recognized entity based on the classifier output (i.e., true or false for each category). An entity can be assigned zero, one, or more categories. At the end of this stage (corresponding to the end of block 402 in FIG. 4), a set of candidate entities are produced based upon the assigned categories.

Determination of Candidate Entities—Ontology/Knowledge Repository Lookup

Referring again to FIG. 4, in block 403 the entity recognition and disambiguation process (as performed by the ERDS) maps the entity profiles (of detected entity mentions) to candidate entities (i.e., entries) specified in knowledge bases to assist in the resolution of which precise entity is being referred to (disambiguation). In order to perform this mapping, it is helpful to first understand how the knowledge bases are organized and how corresponding knowledge base entries are discovered. Disambiguation is described further below.

Knowledge about entities can come from many different sources (e.g., gazetteers for geographic location names, databases of person names, census data, etc.) and appear in very different formats. The size of the knowledge bases can be very large. For example, the gazetteer produced by the National Geospatial-Intelligence Agency (NGA) alone contains information about millions of geographic locations that are outside of the United States. Therefore, it is not practical to access the knowledge sources directly, nor it is efficient to search for entities from the sources. Accordingly, the InFact®/Evri search technology has developed and uses an ontology as an repository to integrate such information from multiple, heterogeneous sources. The ontology repository provides a unified interface for finding entities and corresponding information that is derived from multiple sources and stored in the repository. For many purposes, the entity locating or lookup process needs to be real-time, substantially real time, or "near real-time." Other types of knowledge repositories for combining the information from the multiple sources and for providing a consistent interface to potentially heterogeneous information may be used as well, including other types of data structures other than databases, inverted indices, etc. For the examples described herein, inverted ontology indices have yielded efficient results.

The ontology repository contains a list of entities and information about the entities. Each ontology entry may contain information such as one or more of the following information data:

Name and synonyms of the entity

List of types assigned to the entity (e.g., City, Country, Politician)

Unique identifier and link to original knowledge sources

List of other entities that are related to the entity

Domain-specific, semantic relations (e.g., part-of relations for geographic locations, part-of (Seattle, Wash.)

Placeholder for storing more detailed description of the entity. The description could be represented as natural language text or as a list of phrases.

Placeholder for name-value pairs of other attributes (e.g., coordinates of geographic location)

An example of the ontology entry for the state of Washington is shown in Table 7 below.

TABLE 7

| Attribute Name | Value |
| --- | --- |
| Name | Washington, State of Washington, WA, Wash., Evergreen State |
| Type | Province |
| Part-of-country | United States |
| Knowledge source and ID | USGS-1779804 |
| Coordinate | 47.5, −120.5 |

Ontology Indexing and Lookup

In an example embodiment, the developed ontology repository consists of two components:

(1) An off-line indexing component that creates inverted indices of the ontology entries in order to enable efficient searching. The indexing is scalable to large size broad-coverage data/knowledge repositories (such as a knowledge base).

(2) An on-line search component that, given an entity name as query, as well as certain attributes of the entity, returns all matching ontology entries.

To be practicable for use with the entity recognition and disambiguation system/process, the on-line search (ontology lookup) preferably has very low latency, so that processing each document can be fast (which could involve many lookups). An inverted index is an index structure storing a mapping from words to their locations in a set of documents. The goal is to optimize the speed of the query: to quickly find the documents where word "X" occurs. Inverted index data structures are often used in document retrieval systems (such as Web search engines). For use with the ERDS, each ontology entry is considered a document, and the entity names and attributes of the ontology entry are treated as terms (i.e., keywords) in the document. Thus, when keywords (for example, from the entity profiles) are specified to the ontology search component, the search component retrieves all "documents" (i.e., ontology entries) with matching terms (entity names and attributes). Using the inverted indexing structure, the system can scale to large ontology sizes, perform rapid lookups across potentially thousands, hundreds of thousands or millions of entities matching a particular criterion.

During the ontology lookup, a search usually specifies an entity name (e.g., "Will Smith"), as well as certain attribute constraints associated with the entity (e.g., football player). The search can be handled using at least two basic approaches:

A query can be generated to contain only the entity name. After retrieving the list of ontology entries, some post filtering can be applied to the retrieved list by going through the returned entries and selecting the ones matching the specified attribute constraints.

In addition to entity name, the query can be generated to include partial or all of the attribute constraints. Accordingly, the attribute constraints are resolved during the search. For a common entity name (e.g., person name "John Smith") that might return hundreds, or even thousands of matches, the second approach allows rapidly retrieval of a small list of candidates to work with.

Combinations of these approaches are also possible.

Collecting Related Entities

For each ontology entry, the ontology may store related entities that can be leveraged as additional context clues during the entity disambiguation process (described in the next section). The list of related entities can be generated in a number of ways, including at least the following:

constructed manually;

derived from structured knowledge bases; for example, for movie actor "Will Smith", related entities could include the titles of major movies he acted in, other actors he co-starred with, etc.; or automatically collected from a set of text documents.

A number of techniques are available to automatically determine related entities from a large corpus of text documents. One technique involves the periodic execution of IQL (InFact® Query Language, now referred to as EQL for Evri Query Language) based "tip" queries which result in related entities based on a relevance ranking of clause level entity binding. As additional unstructured text arrives into the system, related entities may change. The InFact®/Evri tip system dynamically evolves the related entities as the text changes. Example tip systems are explained in more depth in U.S. Patent Publication No. 2007/0156669A1, and U.S. patent application Ser. No. 12/049,184, filed Mar. 14, 2008.

In addition to clause level entity relations, another automated technique leverages word or entity co-occurrence, via techniques such as latent semantic regression ("LSR") across the incoming unstructured text to provide additional context hints such as terms or entities which tend to occur near the entity of interest. See, for example, U.S. Pat. No. 6,510,406, issued Jan. 21, 2003; U.S. Pat. No. 6,757,646, issued Jun. 29, 2004; U.S. Pat. No. 7,051,017, issued May 23, 2006; and U.S. Pat. No. 7,269,598, issued Sep. 11, 2007.

Disambiguation—Identify Entities

Once the possible candidate ontology entities (entries in the ontology repository or other knowledge repository) have been retrieved, which could be many (since often entities share the same name), the next step is to determine which of the entities is actually being referred to by the entity mention in the text. The disambiguation process matches the characteristics of the entity described in the text against the attributes of the entities retrieved from the ontology to make this determination. In one example embodiment, the disambiguation process determines a ranking of the candidates, by computing ranking scores based on a combination of several factors, optionally revisiting the ranking as additional information is gleaned.

Figure 8:
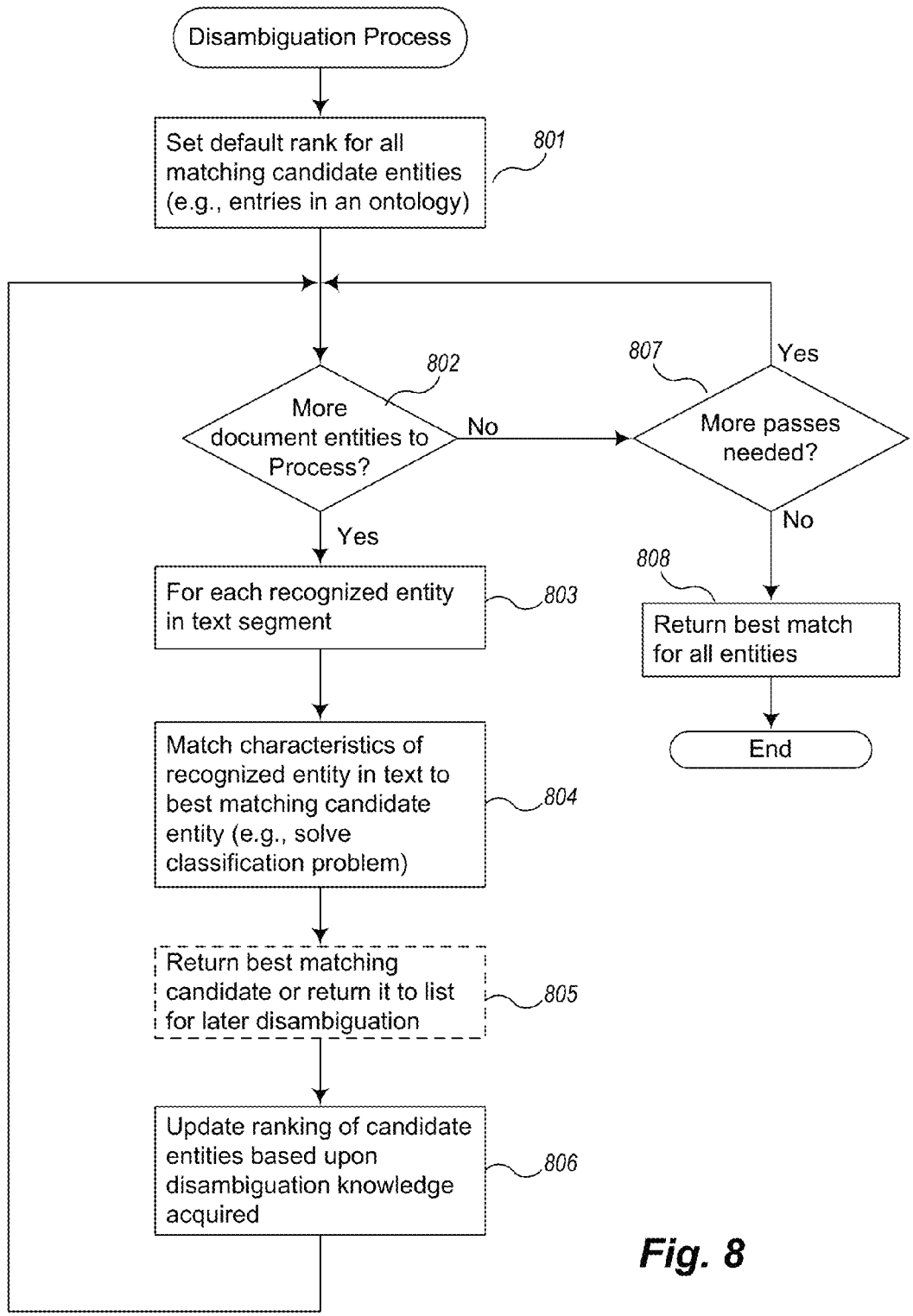
FIG. 8 is an example flow diagram of an example disambiguation process of an example embodiment.

FIG. 8 is an example flow diagram of an example disambiguation process of an example embodiment. In block

801, the process assigns a default ranking score to each candidate entity based on its importance (see subsection on Default Preferences). Then, in blocks 802-806, the disambiguation process examines each recognized entity and attempts to disambiguate it—to choose the best matching candidate entity to more precisely identity the entity in the text segment. In some embodiments, it is not desirable to choose a matching candidate in a first pass, thus the entity in the text segment may be returned to the list to be processed. The list is thus processed unless no entities remain unresolved or until the results do not change (no additional information is learned). Alternatively, in some embodiments, multiple passes of the disambiguation process are performed on some or all of the entities in the text segment until no change is detected. This embodiment is reflected in FIG. 8 in blocks 807-808.

More specifically, in block 802, the process determines whether there are additional entities from the text to be disambiguated, and, if so, continues with block 803, else continues with block 807. In block 803, the disambiguation process gets the next entity from the text segment to process. In block 804, the disambiguation process matches the characteristics of the entity being processed to the matching candidate entities (one or more entries in the ontology) and finds the best possible match. As further described below, this matching process may be solved as a classification problem. In embodiments that delay processing of unresolved entities, in block 805, the process returns the best matching candidate or returns the text segment entity back to the list to be resolved later.

In block 806, the disambiguation process updates the ranking of candidate entities based upon information learned in the process. For example, the ranking may be updated as a result of matching the characteristics of the entity described in the text against the attributes of the candidate entities retrieved from the ontology. As the disambiguation process examines each entity in the document, more information is gained about other entities in the document. Therefore, in some embodiments, it makes sense to revisit the previously resolved entities to check whether to update the previous decision in light of new information. Examples are provided below. The disambiguation process then returns to the beginning of the loop in block 802.

If there were no more entities in the text to disambiguate, then in block 802, the process continues with block 807. Here, in embodiments that support a multi-pass approach, the process determines whether more passes are needed and if so returns to the beginning of the loop in block 802. If not, the process continues in block 808 to return the best matching candidates for all entities, and ends. These best matching candidate entities are considered the identified entities in FIG. 4.

The specifics of each of these blocks are described in more detail in the following subsections.

Default Preferences

The default ranking (preferences) of matching candidates (block 801) is based on each candidate's popularity or importance. For example, a city with a large population or a capital (e.g., Paris, France) is typically ranked higher than other cities, unless there is evidence indicating otherwise. Similarly, a celebrity is more likely to match a person name than a less-known person with an identical name.

The importance of an entity can be determined using one or both of two approaches:

(1) Using a statistical approach, which considers how frequently an entity is mentioned is a large corpus of text (e.g., news articles, web blogs, etc.), as well as how much information exists about the entity in the knowledge sources. For example, the more famous a person, the more likely that detailed information is available about the person in the knowledge repository.

(2) Using a knowledge-based approach, which considers certain domain-specific factors, such as:

Type or role of an entity; e.g., an NFL football player is a more likely match than a high school athlete; Germany the country is a more likely match than a city named Germany (could be found in Georgia, Indiana, and Texas).

Numeric values associated with an entity; e.g., population of cities, number of movies an actor acted in.

"Top N" factor—whether or not an entity appears in a top N list (e.g., the top 100 movie actors, world's largest cities, etc.) which are readily available for many domains.

Number of inbound links; e.g., in Wikipedia, total number of pages that contain hyperlinks pointing to a given entity usually indicates how important or popular the entity is.

Whether or not an entity is referred to by its common or default name; e.g., the name Bob Dylan is more likely referring to the musician than his birth name Robert Zimmerman.

Whether an entity is current (e.g., a person is alive or a historic figure.)

Disambiguation as Classification Problem

In block 804, the disambiguation process examines the characteristics of the entity described in the text against the attributes of the candidate entities retrieved from the ontology to determined the best matching candidate entity. One approach to the disambiguation process is to use classification algorithms to distinguish between various candidate entities.

In a classification problem, each data instance is assigned a class. A classification model is constructed based on training data, and this model can be used to assign a class to a an unseen data instance. The classification model is constructed based on features (properties) of data instances. For disambiguation purposes, each entity can be assigned to either a RELEVANT or a NON-RELEVANT class.

The classification model is built based on manually extracted ground truth (i.e., facts that are known). For example, to construct a classification model, the text in a given document is processed and candidate entities are presented to a human annotator. The annotator then assigns a class to each candidate entity ("RELEVANT" or "NON-RELEVANT"). This classification, together with feature vectors that represent the training data (candidate entries) are stored in a machine readable format. Based on this stored data, a classification model is built using statistical and machine learning techniques.

Once the classification model is constructed for disambiguation purposes, the disambiguation process can then classify newly observed data instances, such as to distinguish between the candidate entities. Newly observed data instances (i.e., the feature vectors generated therefore) can be compared to the stored data using the learning algorithms that implement the classification model. Those that compare more favorably will emerge as better candidates.

More specifically, to perform such disambiguation, as described above, the disambiguation process extracts candidate entities based on string matches to entities in the ontology repository. For example, the string "Will Smith" may match ontology entries for an actor/singer, a football player, a British comedian, a cricket player, or it may represent none of these people. Further, the matching process may apply anaphora resolution to resolve acronyms, first and last names, or abbreviations to full names of entities.

For example, "Will Smith" may be later referred to as "Smith" or as "Will".

Without anaphora resolution, one would have to disambiguate "Smith" between movies with this title, music albums, or multiple people with this same last name. When anaphora resolution is applied, the number of possible candidates may be reduced based on a full name of an entity.

In addition to reducing the number of candidates, the disambiguation process may be enriched through discovered aliases. For example, when the process discovers that CIA is an alias for Culinary Institute of America, it is are able to disambiguate CIA to the Culinary Institute and not to the Central Intelligence Agency.

As an example, consider the following text:
"Will Smith was born in Queens, N.Y. He is an American football defensive end. Smith currently plays for the New Orleans Saints of the NFL."

Through coreferencing and anaphora resolution, the recognition and disambiguation process resolves that "Smith" in the third sentence refers to "Will Smith", and does not further consider candidate entities with the name "Smith" and no first name. Through natural language processing, the entity recognition process establishes that "Will Smith" is a person, that "Will Smith" is a male, and that he is football defensive end. It also determines that the string "Will Smith" is a noun and is a subject in the sentence.

As described in the previous section, each entity in a knowledge repository is associated with a particular role or entity type. Examples of roles include being an actor, an album, a band, a city, a football player, a movie, etc. Each entity may also have other associated properties, which can be stored in the knowledge repository for later retrieval during the classification process. For example, "Will Smith", the football player, may have associated properties such as the name of the team(s) that he plays for and his birthplace. Meanwhile, "Will Smith", the movie actor, may have associated properties such as the names of the movies he starred in. Accordingly, such attributes associated with a subject can help aid in future identification and in the classification of which "Will Smith" has been located, tagged, or otherwise referred to.

For each of the candidate entities matched from the knowledge repository, the disambiguation process constructs a feature vector using:

Part of speech of a phrase (e.g., noun, adjective, etc.);
Grammatical role of a phrase (e.g., subject, object, prepositional complement, etc.);
General entity types (e.g., person, location, organization, date, number, etc.) discovered though Natural Language Processing;
Capitalization of the phrase (more specifically, with regard to the capitalization of a sentence containing the phrase);
Presence of quotes and/or brackets around the entity candidate;
Number of words in a phrase;
Number of entities in a document potentially related to a candidate entity (for the example above, the entities "New Orleans Saints", "NFL", "Queens", and "NY" are potentially related to "Will Smith".); (The knowledge repository may store a list of related entities for each ontology entry as described above.);
Role of entity (e.g., actor, director, musical artist, politician, movie, album, etc.);
Presence of phrase in a standard English lexicon;
Default importance of an entity;
Noun modifiers, appositive modifiers, prepositional modifiers of the phrase (e.g., in the sentence: Movie "Smith" was released in 1987, Smith is modified by movie);
IDF (inverse document frequency) of a phrase;
presence of special characters (comma, dash) in the phrase;
If an entity is a person, using information such as: a) how common is the first and last name, and b) whether the person is alive;
If an entity is used in a sentence in grammatical conjunction, using information about the distribution of candidate entities in this conjunction (e.g., are most of the candidates of the same type as the entity? are they all actors? etc.);
Words in the phrase (the first and last word of a phrase is often indicative of entity type, e.g., first word "Honda" may indicate a vehicle and last word "railway" may indicate a transportation company); and
Coreferencing information about entities (e.g., if both "I am Legend" and "Legend" are mentioned in a text as movies, the "Legend" more likely refers to "I am Legend" than to a different movie also titled "Legend.")

An example of feature vectors for possible "Will Smith" candidates is presented in the Table 8, below:

TABLE 8

| EntityID | Role | Number of Relevant Entities | Standard Type | Default Importance | Relevant |
|---|---|---|---|---|---|
| 123112 | actor | 0 | Person | 5 | No |
| 1232134 | football player | 3 | Person | 2 | Yes |
| 123788 | comedian | 1 | Person | 2 | No |

Such feature vectors are then analyzed using the machine learning and statistical learning capabilities of the previously constructed classification model, to classify each feature vector to determine the more likely candidates. For example, in Table 8, the "Relevant" column is populated after the feature vector is run through the classification model. Thereafter, one or more selected feature vectors also can be stored in machine readable form and used to further inform the model.

Note that in some cases, a large number of potential candidates may exist for an entity. In such cases, it may be beneficial to apply a multi-level approach to classification. According to one approach, the disambiguation process may filter possible candidate entities based on relevant entities that exist in the text and then apply the classification model to classify only entities that pass the filter step. Also, different data structures, such as inverted indices, may be used to speed-up the filtering process. In addition, only a portion of, or additional characteristics may be generated as part of the feature vector to compare with the recognized entity under examination.

Multi-Pass Updating Process

As the disambiguation process examines the various entities in the document and performs disambiguation, it collects more evidence (especially regarding related entities), which can be used to modify the initial disambiguation decisions or to complete unresolved entity disambiguations. For example, given the text "Hawks dominate 49ers in San Francisco," the term "Hawks" is ambiguous. It could refer to the NFL team Seattle Seahawks, or the NBA basketball team Atlanta Hawks, or perhaps many others things. Unable to resolve "Hawks," the disambiguation process may choose to leave it as is and move on to other entities. Only after it processes and resolves other names in the context (e.g., observes that San Francisco 49ers is an NFL football team), it has sufficient evidence that the context relates to NFL football. After that determination, the disambiguation process can return to the disambiguation of "Hawks", and assert higher confidence to the candidate "Seattle Seahawks." One method to accomplish such latent resolution is by maintained a list of unresolved entities. Another method is to perform multiple passes of the resolution process from the beginning. Other approaches are also usable.

In one example embodiment the disambiguation process adopts a multi-pass process that iteratively updates the scores assigned to each candidate. During each iteration, it examines the names in a document sequentially and performs disambiguation based on the contextual evidence collected thus far. The process continues until there is no new evidence produced or until the number of iterations reaches some determined or predetermined limit. To detect this condition, the process checks whether or not the disambiguation of any entities within the context have changed. If so, any new information is included to the subsequent disambiguation of other entities. If not, the disambiguation process completes.

Updating the disambiguation results is based on assumptions such as the existence of parallelism and focus in the surrounding context. Parallelism means similar entities within the same context are more likely to have the same type. For example, when "Ali" is mentioned together with a list of known movie titles, one could be fairly confident that it refers to the name of a movie in this context instead of a person. Geographic focus or a document's main subject can be computed through a majority vote from entities in the context. For example, suppose a text segment mentions several place names, such as Salem, Portland, and Vancouver, where each name is fairly ambiguous. Table 9, below, shows the top and second candidates resolved after the first pass:

TABLE 9

| Name | Top candidate | Second candidate |
| --- | --- | --- |
| Salem | Salem, Massachusetts | Salem, Oregon |
| Portland | Portland, Oregon | Portland, Maine |
| Vancouver | Vancouver, British Columbia | Vancouver, Washington |

Based on the recognition that all three names have candidates as cities near the Portland, Oreg. area (Vancouver, Wash. lies just north of Portland, Oreg.), the updating process could boost the scores for those candidates. As a result, the disambiguation process would select the second candidate for Salem and Vancouver.

The final result of this process (block 808) is a list of entities (e.g., phrases) in the text linked to their most appropriate ontology entries. A link in this sense may be any form of reference or identification of the corresponding ontology entry.

Ranking/Grouping Identified Entities

After the entity recognition and disambiguation process, many entities could be identified from a given document. Instead of simply listing all the entities, an example embodiment of the recognition and disambiguation system may organize or summarize the entities within a document (see block 405 of FIG. 4) by, for example:

Ranking—sorting the set of entities based on a certain order (e.g., importance within the document), then presenting the top ranked entities;

Grouping—grouping the set of entities into subsets that share certain properties (e.g., place names of same country or region)

Ranking

Given a list of entities tagged in a document, this process ranks the entities based on their relevance to the main subject or focus of the document. Features extracted for such a ranking process may include one or more of the following features:

Frequency of the entity occurring in the document;

Location of the entity in the document, e.g., in title, first paragraph, caption, etc.;

Uniqueness of the entity in the document versus in a collection or corpus. One way to measure the uniqueness is to compute inverse document frequency (IDF). For example, it is possible to determine that entities such as "United States" or "Associated Press" are very common, and therefore, should be ranked lower;

Relevance to main focus or theme of the surrounding text (e.g., geographic focus—"this document is about Iraq", document subject—politics, entertainment, etc), which can be automatically extracted from the document or provided as document metadata attributes;

Confidence score computed from previous steps; or

Predefined preferences.

A ranking score can be computed based on a weighted combination of one or more of the above factors. In some embodiments, the ERDS builds a regression model to automatically determine the values of the weights that should be assigned to each factor. A regression method models the relationship of a response variable (ranking score in this case) to a set of predicting factors. In preparation, the ERDS first collects a set of training data that consists of a set of documents, where the ranking of the top entities in each document has been manually verified. Then, using the training data, it automatically estimates parameters (i.e., weights) of the regression model. Then, when presented with a previously unseen document, the ERDS can then apply the regression model to entities found in the document and predict each entity's ranking score.

Grouping

The recognition and disambiguation system can also organize the resulting entities by grouping them based on certain properties associated with the entities. One property for grouping purposes is an entity's type. For example, entities can be grouped into categories such as places, people, and organizations. The groupings can be further organized into an hierarchy. For example, place names can be further grouped into cities, countries, regions, etc. Accordingly, given a document, the entities identified in the document can be viewed as groups in different granularities of the hierarchy.

Another property for grouping is the "part-of" (or "member-of") relation. For example, given an article describing football games, the players mentioned in the text can be grouped according to the football teams they belong to. Similarly, for place names, they can be grouped based on the countries or regions they are part of.

Other grouping and/or ranking techniques can similarly be incorporated, and used by the ERDS to present the entities resulting from the disambiguation process.

Figure 9:
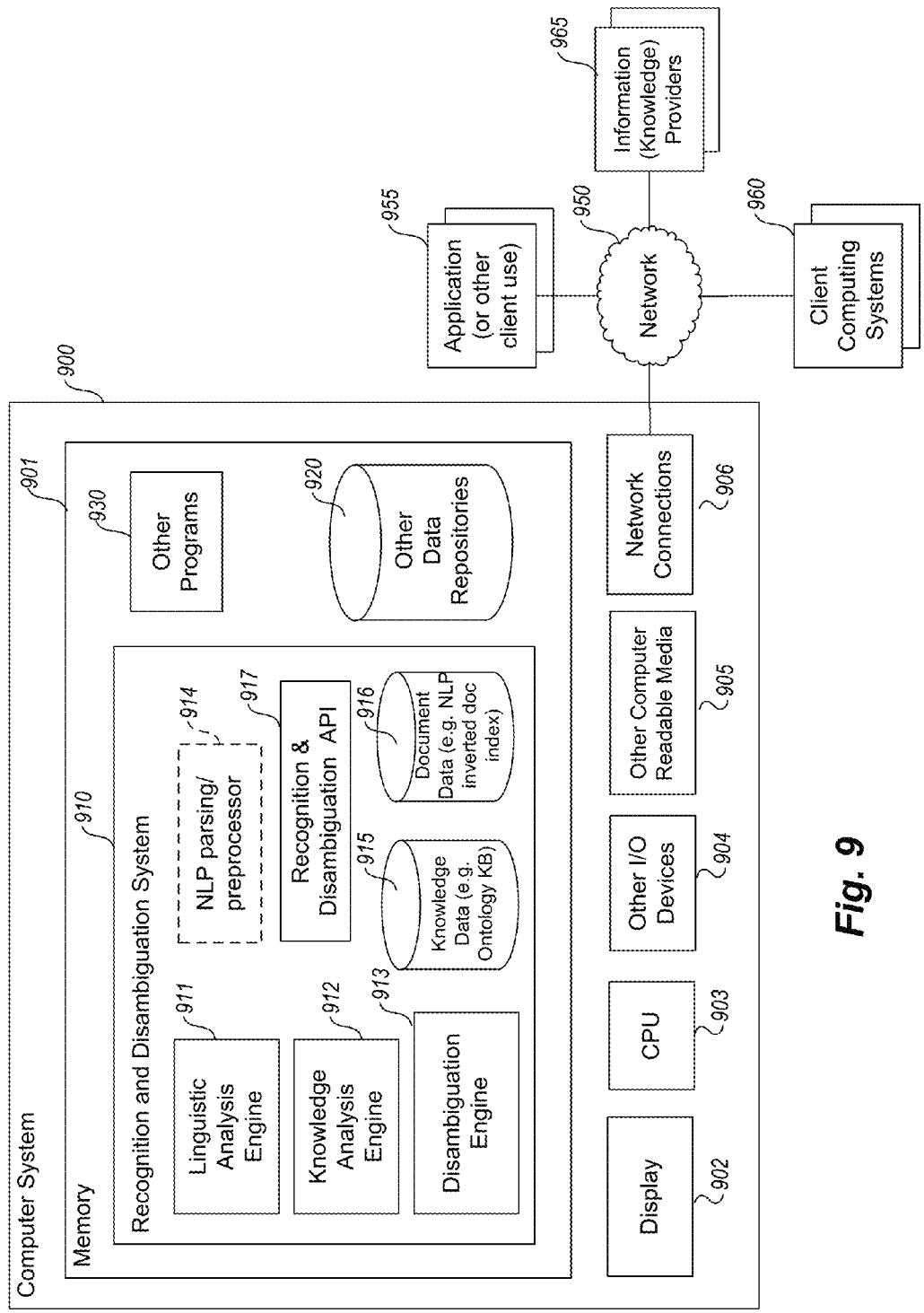
FIG. 9 is an example block diagram of an example computing system that may be used to practice embodiments of a recognition and disambiguation system such as that described herein.

FIG. 9 is an example block diagram of an example computing system that may be used to practice embodiments of a recognition and disambiguation system such as that described herein. Note that a general purpose or a special purpose computing system may be used to implement an RDS. Further, the RDS may be implemented in software, hardware, firmware, or in some combination to achieve the capabilities described herein.

Computing system 900 may comprise one or more server and/or client computing systems and may span distributed locations. In addition, each block shown may represent one or more such blocks as appropriate to a specific embodiment or may be combined with other blocks. Moreover, the various blocks of the RDS 910 may physically reside on one or more machines, which use standard (e.g., TCP/IP) or proprietary interprocess communication mechanisms to communicate with each other.

In the embodiment shown, computer system 900 comprises a computer memory ("memory") 901, a display 902, one or more Central Processing Units ("CPU") 903, Input/Output devices 904 (e.g., keyboard, mouse, CRT or LCD display, etc.), other computer-readable media 905, and network connections 906. The RDS 910 is shown residing in memory 901. In other embodiments, some portion of the contents, some of, or all of the components of the RDS 910 may be stored on and/or transmitted over the other computer-readable media 905. The components of the RDS 910 preferably execute on one or more CPUs 903 and perform entity identification (recognition and disambiguation), as described herein. Other code or programs 930 and potentially other data repositories, such as data repository 920, also reside in the memory 910, and preferably execute on one or more CPUs 903. Of note, one or more of the components in FIG. 9 may not be present in any particular implementation. For example, some embodiments embedded in other software may not provide means for other user input or display.

In a typical embodiment, the RDS 910 includes a linguistic analysis engine 911, a knowledge analysis engine 912, a disambiguation engine 913, an NLP parsing engine or preprocessor 914, an RDS API 917, a data repository (or interface thereto) for storing document NLP and disambiguation data 916, and a knowledge data repository 915, for example, an ontology index, for storing information from a multitude of internal and/or external sources. In at least some embodiments, the NLP parsing engine/preprocessor 914 is provided external to the RDS and is available, potentially, over one or more networks 950. Other and or different modules may be implemented. In addition, the RDS 910 may interact via a network 950 with applications or client code 955 that uses results computed by the RDS 910, one or more client computing systems 960, and/or one or more third-party information provider systems 965, such as purveyors of information used in knowledge data repository 915. Also, of note, the knowledge data 915 may be provided external to the RDS as well, for example in an ontology knowledge base accessible over one or more networks 950.

In an example embodiment, components/modules of the RDS 910 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described use well-known or proprietary synchronous or asynchronous client-sever computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by a RDS implementation.

In addition, programming interfaces to the data stored as part of the RDS 910 (e.g., in the data repositories 915 and 916) can be made available by standard means such as through C, C++, C#, and Java APIs; libraries for accessing files, databases, or other data repositories; through scripting languages such as XML; or through Web servers, FTP servers, or other types of servers providing access to stored data. The data repositories 915 and 916 may be implemented as one or more database systems, file systems, or any other method known in the art for storing such information, or any combination of the above, including implementation using distributed computing techniques.

Also, the example RDS 910 may be implemented in a distributed environment comprising multiple, even heterogeneous, computer systems and networks. For example, in one embodiment, the modules 911-914, and 917, and the data repositories 915 and 916 are all located in physically different computer systems. In another embodiment, various modules of the RDS 910 are hosted each on a separate server machine and may be remotely located from the tables which are stored in the data repositories 915 and 916. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.). Other variations are possible. Also, other functionality could be provided by each component/module, or existing functionality could be distributed amongst the components/modules in different ways, yet still achieve the functions of a RDS.

Furthermore, in some embodiments, some or all of the components of the RDS may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be transmitted as contents of generated data signals (e.g., by being encoded as part of a carrier wave or otherwise included as part of an analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/980,747, entitled "NLP-BASED ENTITY RECOGNITION AND DISAMBIGUATION," filed Oct. 17, 2007 and U.S. Non-Provisional Patent Application No. 12/288,158, entitled "NLP-BASED ENTITY RECOGNITION AND DISAMBIGUATION," filed Oct. 15, 2008 and published under U.S. Patent Publication No. 2009/0144609 on Jun. 4, 2009, are incorporated herein by reference, in their entirety.

From the foregoing it will be appreciated that, although specific embodiments have been described herein for purposes of illustration, various modifications may be made without deviating from the spirit and scope of this disclosure. For example, the methods, techniques, and systems for entity recognition and disambiguation are applicable to other architectures other than an InFact®/Evri architecture or a Web-based architecture. For example, other systems that are programmed to perform natural language processing can be employed. Also, the methods, techniques, and systems discussed herein are applicable to differing query languages, protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer-implemented method for disambiguating one or more entities in an indicated text segment, comprising:
    processing the indicated text segment to determine a plurality of terms and their associated parts-of-speech tags and grammatical roles;
    performing linguistic analysis of the processed text segment to determine one or more potential entities which are referred to in the text segment by potential entity names;
    generating and storing, for each potential entity, an entity profile data structure storing one or more associated properties that characterize the entity based upon surrounding context and linguistic information received from the performed linguistic analysis of the processed text segment, the entity profile properties including one or more roles attributable to the potential entity based upon actions and/or modifiers associated with the determined potential entity name that have been retrieved from a linguistic analysis of the surrounding context;
    disambiguating which entities are being referred to in the indicated text segment by determining one or more mostly likely entities that are referred to in the text segment by comparing, using both linguistic and contextual information, the entity profiles generated for each potential entity with attributes of one or more candidate entities retrieved from a data repository; and
    invoking the method to annotate information on a web page.

2. The method of claim 1 wherein the candidate entities are entity entries retrieved from a knowledge repository.

3. The method of claim 2 wherein the knowledge repository is an ontology knowledge base.

4. The method of claim 1 wherein the disambiguating which entities are being referred to in the indicated text segment by determining of the one or more mostly likely entities which are referred to in the text segment by comparing, using both linguistic and contextual information, the entity profiles generated for each potential entity name with attributes of one or more candidate entities further comprises:
    searching a knowledge repository for a set of candidate entities that have similar characteristics to the properties of one or more of the generated entity profiles;
    ranking the candidate entities in the set of candidate entities to determine a set of mostly likely entities which are referred to in the text segment; and
    providing the determined set of mostly likely entities.

5. The method of claim 4 wherein the ranking the candidate entities weights the candidate entities according to contextual information surrounding portions of the text segment that refer to the potential entity names.

6. The method of claim 4 wherein the ranking the candidate entities weights the candidate entities according to preference information.

7. The method of claim 4 wherein the ranking the candidate entities further comprises using a classification model to classify the candidate entities and to order them based upon closest matches.

8. The method of claim 1 wherein the disambiguating which entities are being referred to in the indicated text segment by determining the one or more most likely entities which are referred to in the text segment by comparing, using both linguistic and contextual information, the entity profiles generated for each potential entity name with attributes of one or more candidate entities further comprises:
    resolving the one or more most likely entities to a single identified entity by performing iterative comparisons reusing entity disambiguation information gained from a prior comparison until no new entity disambiguation information is gained.

9. The method of claim 8 wherein the terms are weighted based upon at least one of a binary weight or a frequency weight.

10. The method of claim 1 wherein each entity profile comprises a feature vector of terms collected from modifiers and/or actions associated with the potential entity name based upon the linguistic analysis of the processed text segment.

11. The method of claim 1, further comprising providing a ranked list of the determined one or more most likely entities which are referred to in the text segment.

12. The method of claim 1, further comprising using the determined one or more likely entities to inform a relationship search.

13. The method of claim 1, further comprising:
performing the method in response to selection of a user interface component.

14. The method of claim 1 wherein the method is embedded in code that supports a widget presented on a web page.

15. A non-transitory computer-readable medium containing contents that, when executed causes a computing system to perform a method comprising:
processing the indicated text segment to determine a plurality of terms and their associated parts-of-speech tags and grammatical roles;
performing linguistic analysis of the processed text segment to determine one or more potential entities which are referred to in the text segment by potential entity names;
generating and storing, for each potential entity, an entity profile data structure storing one or more associated properties that characterize the entity based upon surrounding context and linguistic information, the entity profile properties including one or more roles attributable to the potential entity based upon actions and/or modifiers associated with the entity name that have been retrieved from a linguistic analysis of the surrounding context;
automatically disambiguating which entities are being referred to in the indicated text segment by determining one or more mostly likely entities that are referred to in the text segment by comparing, using both linguistic and contextual information, the entity profiles generated for each potential entity with attributes of one or more candidate entities retrieved from a knowledge base; and
causing information to be annotated on a web page.

16. The non-transitory computer-readable medium of claim 15, wherein the medium is a memory in a computing system containing the contents.

17. The non-transitory computer-readable medium of claim 15 wherein the contents are instructions that, when executed, cause a computer processor in the computing device to perform the method.

18. The non-transitory computer-readable medium of claim 15 embedded in a computing system configured to perform indexing and storing of a corpus of documents for searching using natural language processing.

19. An entity recognition and disambiguation computing system, comprising;
a memory;
a computer processor; and
a recognition and disambiguation module stored in the memory that is configured, when executed on the computer processor, to
receive a text segment for processing;
process the received text segment to determine a plurality of terms and their associated parts-of-speech tags and grammatical roles;
perform linguistic analysis of the processed text segment to determine one or more potential entities which are referred to in the processed text segment by potential entity names;
generate and store, for each potential entity, an entity profile data structure storing one or more associated properties that characterize the entity based upon surrounding context and linguistic information received from the linguistic analysis of the processed text segment, the entity profile properties including one or more roles attributable to the potential entity based upon actions and/or modifiers associated with the determined potential entity name that have been retrieved from a linguistic analysis of the surrounding context;
disambiguate the potential entities to determine a single named entity to which the received text segment is deemed to refer, based upon a combination of linguistic analysis, contextual information gleaned from text surrounding the potential entity name in the received text segment, and information retrieved from one or more knowledge repositories, by comparing the entity profiles generated for each potential entity with attributes of one or more candidate entities; and
causing information on a web page to be annotated.

20. The system of claim 19, wherein the module is further configured, when executed, to disambiguate the candidate named entities using information based upon a relationship search.

21. The system of claim 19 wherein the module is further configured, when executed, to disambiguate the candidate named entities using a classification modeling approach.

22. A computer-implemented method for presenting information regarding named entities comprising:
receiving an indication of a segment of text;
invoking the recognition and disambiguation module of claim 19 to process the indicated text segment to automatically determine one or more named entities referred to in the text segment; and
for each determined one or more named entities, presenting a link to information associated with the named entity.

23. The method of claim 22 wherein the information is based in part upon an ontology entry.

* * * * *

UNITED STATES PATENT AND TRADEMARK OFFICE
CERTIFICATE OF CORRECTION

PATENT NO.       : 9,613,004 B2                              Page 1 of 1
APPLICATION NO.  : 13/944340
DATED            : April 4, 2017
INVENTOR(S)      : Jisheng Liang et al.

It is certified that error appears in the above-identified patent and that said Letters Patent is hereby corrected as shown below:

In Column 26, Line 1 (Claim 19), the subparagraph should be further indented.

In Column 26, Line 2 (Claim 19), the subparagraph should be further indented with a hanging indent.

In Column 26, Line 5 (Claim 19), the subparagraph should be further indented with a hanging indent.

In Column 26, Line 9 (Claim 19), the subparagraph should be further indented with a hanging indent.

In Column 26, Line 19 (Claim 19), the subparagraph should be further indented with a hanging indent.

In Column 26, Line 29 (Claim 19), the subparagraph should be further indented.

Signed and Sealed this
Fourth Day of July, 2017

Joseph Matal
*Performing the Functions and Duties of the
Under Secretary of Commerce for Intellectual Property and
Director of the United States Patent and Trademark Office*